United States Patent
Guo et al.

(10) Patent No.: US 10,687,283 B2
(45) Date of Patent: *Jun. 16, 2020

(54) STATUS CHANGING APPARATUS AND METHOD

(71) Applicant: Huawei Technologies Co., Ltd., Shenzhen, Guangdong (CN)

(72) Inventors: Xiaolong Guo, Tokyo (JP); Song Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,318

(22) Filed: Jan. 18, 2019

(65) Prior Publication Data

US 2019/0159131 A1 May 23, 2019

Related U.S. Application Data

(63) Continuation of application No. 15/264,340, filed on Sep. 13, 2016, now Pat. No. 10,237,825, which is a (Continued)

(51) Int. Cl.
*H04W 4/00* (2018.01)
*H04W 52/02* (2009.01)
(Continued)

(52) U.S. Cl.
CPC ......... *H04W 52/0235* (2013.01); *H04L 69/28* (2013.01); *H04W 40/005* (2013.01);
(Continued)

(58) Field of Classification Search
None
See application file for complete search history.

(56) References Cited

U.S. PATENT DOCUMENTS 7,970,828 B2  6/2011 Carmeli et al.
2004/0264397 A1  12/2004 Benveniste
(Continued)

FOREIGN PATENT DOCUMENTS

CN  101682891 A  3/2010
CN  102724703 A  10/2012
(Continued)

OTHER PUBLICATIONS

U.S. Appl. No. 15/264,340, filed Sep. 13, 2016.

*Primary Examiner* — Elisabeth Benoit Magloire
(74) *Attorney, Agent, or Firm* — Leydig, Voit & Mayer, Ltd.

(57) ABSTRACT

A data processing apparatus and method that relate to the field of communications network technologies are provided which are used to solve a problem of how to reduce power consumption of a UE. In embodiments of the present invention, an acquiring module acquires a first maximum downlink delay tolerance (MDDT) sent by a core network entity, and provides the first MDDT to a determining module, where the first MDDT indicates a maximum delay tolerance value corresponding to processing, by the apparatus, downlink data of all services on the apparatus; the determining module determines time information of a first MDDT timer by using the first MDDT; and a changing module changes a UE status according to the time information of the first MDDT timer determined by the determining module or changes a UE status according to time information of a first IST.

16 Claims, 10 Drawing Sheets

---

801 — A user equipment UE acquires a first maximum downlink delay tolerance MDDT sent by a core network entity, where the first MDDT indicates a maximum delay tolerance value corresponding to processing, by the UE, downlink data of all services on the UE 802 — The UE determines time information of a first MDDT timer by using the first MDDT, where the time information of the first MDDT timer includes start time and end time of a UE status corresponding to the first MDDT 803 — The UE changes the UE status according to the time information of the first MDDT timer

Related U.S. Application Data continuation of application No. PCT/CN2014/073480, filed on Mar. 14, 2014.

(51) Int. Cl.
| | |
|---|---|
| *H04L 29/06* | (2006.01) |
| *H04W 40/00* | (2009.01) |
| *H04W 68/02* | (2009.01) |
| *H04W 88/02* | (2009.01) |
| *H04W 88/14* | (2009.01) |

(52) U.S. Cl.
CPC ....... *H04W 52/0216* (2013.01); *H04W 68/02* (2013.01); *H04W 88/02* (2013.01); *H04W 88/14* (2013.01); *Y02D 70/00* (2018.01); *Y02D 70/1224* (2018.01); *Y02D 70/1262* (2018.01); *Y02D 70/142* (2018.01); *Y02D 70/146* (2018.01); *Y02D 70/24* (2018.01)

(56) References Cited

U.S. PATENT DOCUMENTS

| | | |
|---|---|---|
| 2009/0221304 A1 | 9/2009 | Pudney |
| 2011/0116427 A1 | 5/2011 | Chang et al. |
| 2011/0264937 A1 | 10/2011 | Meisner et al. |
| 2012/0208486 A1 | 8/2012 | Liao |
| 2012/0210032 A1 | 8/2012 | Wang et al. |
| 2012/0210104 A1* | 8/2012 | Danko ................. G06F 9/30076 712/229 |
| 2013/0155954 A1 | 6/2013 | Wang et al. |
| 2013/0201852 A1 | 8/2013 | Chou et al. |
| 2013/0215850 A1 | 8/2013 | Zakrzewski et al. |
| 2013/0265924 A1 | 10/2013 | Kim et al. |
| 2013/0324104 A1 | 12/2013 | Cavilla et al. |
| 2014/0016614 A1 | 1/2014 | Velev |
| 2014/0029500 A1 | 1/2014 | Luo et al. |
| 2014/0044027 A1* | 2/2014 | Beale .................... H04W 56/00 370/311 |
| 2014/0056198 A1* | 2/2014 | Quan ................ H04W 52/0216 370/311 |
| 2014/0173636 A1* | 6/2014 | Maciocco ............ G06F 1/3206 719/318 |
| 2017/0150466 A1 | 5/2017 | Sunell et al. |

FOREIGN PATENT DOCUMENTS

| | | |
|---|---|---|
| CN | 103168498 A | 6/2013 |
| CN | 103460189 A | 12/2013 |
| EP | 1973355 A1 | 9/2008 |

\* cited by examiner

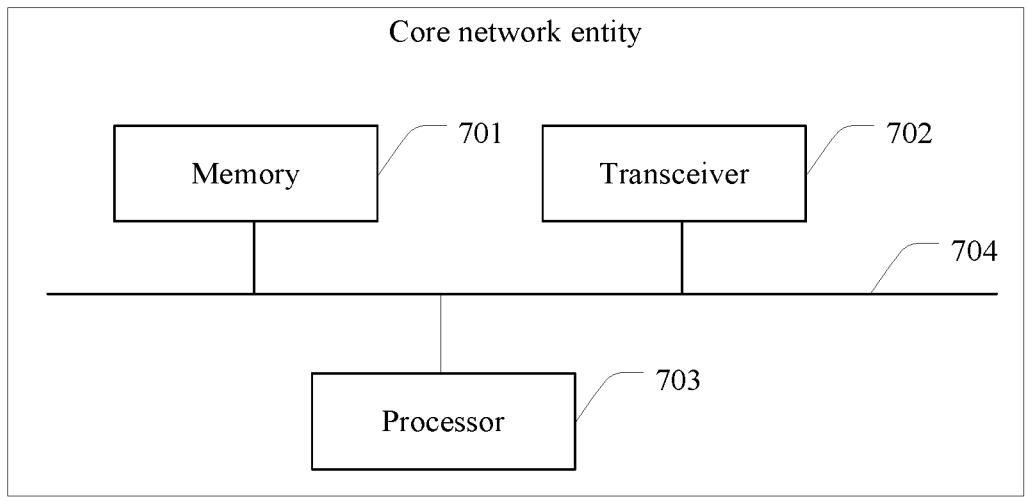

FIG. 7

| 801 | A user equipment UE acquires a first maximum downlink delay tolerance MDDT sent by a core network entity, where the first MDDT indicates a maximum delay tolerance value corresponding to processing, by the UE, downlink data of all services on the UE |

| 802 | The UE determines time information of a first MDDT timer by using the first MDDT, where the time information of the first MDDT timer includes start time and end time of a UE status corresponding to the first MDDT |

| 803 | The UE changes the UE status according to the time information of the first MDDT timer |

FIG. 8(a)

STATUS CHANGING APPARATUS AND METHOD

CROSS-REFERENCE TO RELATED APPLICATIONS

This application is a continuation of U.S. patent application Ser. No. 15/264,340, filed on Sep. 13, 2016, which is a continuation of International Application No. PCT/CN2014/073480, filed on Mar. 14, 2014. All of the afore-mentioned patent applications are hereby incorporated by reference in their entireties.

TECHNICAL FIELD

Embodiments of the present invention relate to the field of communications technologies, and in particular, to a data processing apparatus and method.

BACKGROUND

With popularity of technologies of the Internet of Things, a user equipment (UE) is used for an increasingly long time in daily life at present, and therefore a relatively large amount of electricity of the UE needs to be consumed. Generally, a limited amount of electricity is stored in a UE; therefore, in order to achieve longer-time use of the UE, power consumption of the UE needs to be reduced.

In the prior art, in order to reduce a power consumption rate of a UE, two types of states are generally set for the UE, namely, an idle state and an active state. When the UE is connected to a network, and sends uplink data and receives downlink data, the UE is in the active state; when the UE listens on the network discontinuously and does not send or receive data, the UE is in the idle state. Generally, when the UE has no uplink data to send or downlink data to receive, the active state is changed to the idle state. When the UE is in the idle state, the UE does not listen on the network continuously, but listens on downlink paging in a discontinuous reception (DRX) manner at intervals, and performs cell measurement continuously. When the UE in the idle state receives signaling of downlink data or needs to send uplink data, the idle state is changed to the active state. When the UE in the idle state is on a paging occasion (PO), the UE listens on downlink data/paging/broadcast and measures cell information. A PO period is configured by the network and ranges from 10 ms to 2560 ms.

However, for a UE corresponding to a delay-insensitive service, states in which the UE is connected to a network are simply classified into an active state and an idle state for power saving in the prior art. In the idle state, the UE listens on the network according to a constant PO period; when there is a significant difference between an interval at which the UE receives downlink data and time during which the UE is in the idle state, the UE is in the idle state but does not send uplink data or receive downlink data for a long time, which causes unnecessary power consumption of the UE.

SUMMARY

Embodiments of the present invention provide a data processing apparatus and method that are used to solve a problem of how to reduce power consumption of a UE.

According to a first aspect, an embodiment of the present invention provides a data processing apparatus, including:
an acquiring module, configured to acquire a first maximum downlink delay tolerance MDDT sent by a core network entity, and provide the first MDDT to a determining module, where the first MDDT indicates a maximum delay tolerance value corresponding to processing, by the apparatus, downlink data of all services on the apparatus;
the determining module, configured to determine time information of a first MDDT timer by using the first MDDT, where the time information of the first MDDT timer includes start time and end time of a UE status corresponding to the first MDDT; and
a changing module, configured to change the UE status according to the time information of the first MDDT timer determined by the determining module.

In a first possible embodiment, with reference to the first aspect, the acquiring module is further configured to acquire a first idle state IS value and provide the first IS value to the determining module, where the first IS value is duration when the apparatus is in an idle state;
the determining module is further configured to determine time information of a first idle state timer IST by using the first IS value, where the time information of the first IST includes start time and end time of a UE status corresponding to the first IS value; and
the changing module is further configured to change the UE status according to the time information of the first IST determined by the determining module.

In a second possible embodiment, with reference to the first aspect or the first possible embodiment of the first aspect, the changing module includes:
a starting unit, configured to: after the apparatus in a first active state completes data sending/receiving processing, start the first MDDT timer and inform a changing unit at start time of the first MDDT timer that the first MDDT timer is started; and
the changing unit, configured to: when the apparatus is in the first active state and learns that the starting unit has started the first MDDT timer, change the first active state to a first sleep mode SLM state at the start time of the first MDDT timer, where the first active state is a state in which the apparatus sends/receives data, and the first SLM state is a state in which the apparatus stops listening on a network and forbids receiving downlink data; and
the starting unit, further configured to start the first MDDT timer at end time of the first IST, and inform the changing unit at the start time of the first MDDT timer that the first MDDT timer is started; and
the changing unit, further configured to: when the apparatus is in a first idle state and learns that the starting unit has started the first MDDT timer, change the first idle state to the first SLM state at the start time of the first MDDT timer.

In a third possible embodiment, with reference to the second possible embodiment of the first aspect,
the starting unit is further configured to start the first IST at end time of the first MDDT timer, and inform the changing unit at start time of the first IST that the first IST is started; and
the changing unit is further configured to: when the apparatus is in the first SLM state and learns that the starting unit has started the first IST, change the first SLM state to the first idle state at the start time of the first IST, where the first idle state is a state in which the apparatus listens on the network in a discontinuous reception DRX manner.

In a fourth possible embodiment, with reference to the first aspect or any one of the foregoing possible embodiments of the first aspect,
the acquiring module is further configured to acquire a maximum uplink delay tolerance MUDT sent by the core network entity, where the MUDT indicates a maximum delay tolerance value corresponding to processing, by the apparatus, uplink data of all the services on the apparatus.

In a fifth possible embodiment, with reference to the first aspect or any one of the foregoing possible embodiments of the first aspect, the changing module further includes: a stopping unit, where:

the acquiring module is further configured to acquire mobile originated MO or receive a downlink paging signal, provide information about the MO or the received downlink paging signal to the sending module, and inform the stopping unit that the MO is acquired, where the MO includes MO data and MO signaling;

the sending module is configured to: when the acquiring module receives the downlink paging signal, initiate a network access signal, and inform the stopping unit that the network access signal is initiated;

the stopping unit is configured to: when the apparatus is in the first idle state, and the apparatus initiates the MO or the sending module has initiated the network access signal, stop the first IST and inform the changing unit that the first IST is stopped because of the MO or because an accessing module initiates access to the network; and the changing unit is further configured to: on a basis that the stopping unit informs the changing unit that the first IST is stopped because of the MO or because the accessing module initiates access to the network, change the first idle state to the first active state, and provide, to the sending module, a message carrying that the first idle state is changed to the first active state; and the apparatus further includes: the sending module, where:

the sending module is configured to execute initiation of the MO when the first idle state is changed to the first active state; and the sending module is further configured to execute initiation of the MO according to a preset manner when the apparatus is in the first SLM state and the apparatus initiates the MO.

In a sixth possible embodiment, with reference to the fifth possible embodiment of the first aspect, the stopping unit is further configured to: when the apparatus is in the first SLM state, and the apparatus initiates the MO data, stop the first MDDT timer and inform the changing unit that the first MDDT timer is stopped because of the MO data; and when the apparatus needs to send the MO signaling, stop the first MDDT timer and inform the changing unit that the first MDDT timer is stopped because of the MO signaling;

the changing unit is further configured to: on a basis that the stopping unit informs the changing unit that the first MDDT timer is stopped because of the MO data or the MO signaling, change the first SLM state to the first active state, and provide, to the sending module, a message carrying that the first SLM state is changed to the first active state; and the sending module is further configured to execute initiation of the MO data when the changing unit changes the first SLM state to the first active state.

In a seventh possible embodiment, with reference to the sixth possible embodiment of the first aspect, the apparatus further includes a comparing module, where:

the acquiring module is further configured to: when the apparatus is in the first SLM state and the apparatus initiates the MO data, acquire an MUDT corresponding to the MO data, and provide the MUDT corresponding to the MO data to the comparing module;

the comparing module is configured to compare the MUDT with remaining time that is set for the first MDDT timer, and provide a comparison result to the stopping unit and the changing unit;

the stopping unit is further configured to: when the MUDT is less than the remaining time that is set for the first MDDT timer, stop the first MDDT timer and inform the changing unit that the first MDDT timer is stopped because the MUDT is less than the remaining time that is set for the first MDDT timer;

the changing unit is further configured to: on a basis that the stopping unit informs the changing unit that the first MDDT timer is stopped because the MUDT is less than the remaining time that is set for the first MDDT timer, change the first SLM state to the first active state, and provide, to the sending module, a message carrying that the first SLM state is changed to the first active state;

the changing unit is further configured to: when the MUDT is greater than or equal to the remaining time that is set for the first MDDT timer, wait until time that is set for the first MDDT timer expires, and change the first SLM state to the first active state; and the sending module is further configured to execute initiation of the MO data when the changing unit changes the first SLM state to the first active state.

In an eighth possible embodiment, with reference to the first aspect or any one of the foregoing possible embodiments of the first aspect, the sending module is further configured to send, to the core network entity, an MDDT corresponding to the apparatus or an MDDT corresponding to each service on the apparatus, where both the MDDT corresponding to the apparatus and the MDDT corresponding to each service on the apparatus are bases for obtaining the first MDDT; and/or the sending module is further configured to send, to the core network entity, an IS value corresponding to the apparatus, where the IS value corresponding to the apparatus is a basis for obtaining the first IS value.

In a ninth possible embodiment, with reference to the first aspect or any one of the foregoing possible embodiments of the first aspect, the first MDDT is less than or equal to the MDDT corresponding to the apparatus, a second MDDT is less than or equal to the MDDT corresponding to the apparatus, and the first MDDT is greater than or equal to the second MDDT, where the second MDDT indicates a maximum delay tolerance value corresponding to processing, by the core network entity, the downlink data of all the services on the apparatus; and when the first MDDT is greater than the second MDDT, the first IS value is less than a second IS value, and that a sum of the first MDDT and the first IS value equals a sum of the second MDDT and the second IS value is satisfied, where the second IS value is duration when the core network entity is in an idle state when processing all the services on the apparatus.

In a tenth possible embodiment, with reference to the first aspect or any one of the foregoing possible embodiments of the first aspect, the first SLM state is a state in which the apparatus stops listening on the network and forbids sending uplink data and receiving downlink data.

According to a second aspect, an embodiment of the present invention provides another data processing apparatus, including:

a determining module, configured to: determine a second maximum downlink delay tolerance MDDT, where the second MDDT indicates a maximum delay tolerance value corresponding to processing, by the apparatus, downlink data of all services on a user equipment UE, and the UE is any user equipment managed by the apparatus; and determine time information of a second MDDT timer by using the second MDDT, where the time information of the second MDDT timer includes start time and end time of a core network entity status corresponding to the second MDDT; and a changing module, configured to change the core network entity status according to the time information of the second MDDT timer determined by the determining module.

In a first possible embodiment, with reference to the second aspect, the determining module is further configured to: determine a second idle state IS value, where the second IS value is duration when the apparatus is in an idle state when processing all the services on the UE; and determine time information of a second idle state timer IST by using the second IS value, where the time information of the second IST includes start time and end time of a core network entity status corresponding to the second IS value; and the changing module is further configured to change the core network entity status according to the time information of the second IST timer determined by the determining module.

In a second possible embodiment, with reference to the second aspect or the first possible embodiment of the second aspect, the changing module includes: a starting unit and a changing unit, where:

the starting unit is configured to: after the apparatus in a second active state completes sending/receiving processing on data of the UE, start the second MDDT timer and inform the changing unit at start time of the second MDDT timer that the second MDDT timer is started;

the changing unit is configured to: when the apparatus is in the second active state and learns that the starting unit has started the second MDDT timer, change the second active state to a second sleep mode SLM state at the start time of the second MDDT timer, where the second active state is a state in which the apparatus sends/receives the data of the UE, and the second SLM state is a state in which sending downlink data of the UE is forbidden;

the starting unit is further configured to start the second MDDT timer at end time of the second IST, and inform the changing unit at the start time of the second MDDT timer that the second MDDT timer is started; and the changing unit is further configured to: when the apparatus is in a second idle state and learns that the starting unit has started the second MDDT timer, change the second idle state to the second SLM state.

In a third possible embodiment, with reference to the first possible embodiment of the second aspect, the starting unit is further configured to start the second IST at end time of the second MDDT timer, and inform the changing unit at start time of the second IST that the second IST is started; and the changing unit is further configured to: when the apparatus is in the second SLM state and learns that the starting unit has started the second IST, change the second SLM state to the second idle state, where the second idle state is a state in which the apparatus sends paging information to the UE in a discontinuous reception DRX manner.

In a fourth possible embodiment, with reference to the second aspect or any one of the foregoing possible embodiments of the second aspect, the apparatus further includes: a receiving module, a setting module, and an acquiring module, where:

the receiving module is configured to: receive an MDDT corresponding to the UE that is sent by the UE; or receive an MDDT corresponding to each service on the UE that is sent by the UE, and provide the MDDT corresponding to each service on the UE to the determining module; and receive an IS value corresponding to the UE that is sent by the UE;

the determining module is configured to determine, by using the MDDT corresponding to each service on the UE, the MDDT corresponding to the UE;

the setting module is configured to set the IS value corresponding to the UE; and the acquiring module is configured to acquire, from a home subscriber server HSS, the MDDT corresponding to the UE or the IS value corresponding to the UE.

In a fifth possible embodiment, with reference to the third possible embodiment of the second aspect, the apparatus further includes a sending module, where:

the determining module is further configured to: determine a first MDDT and the second MDDT by using the MDDT corresponding to the UE, where the first MDDT indicates a maximum delay tolerance value corresponding to processing, by the UE, the downlink data of all the services on the UE; determine a first IS value and the second IS value by using the IS corresponding to the UE, where the first IS value is duration when the UE is in an idle state; and provide the first MDDT and the first IS value to the sending module; and the sending module is configured to send the first MDDT and the first IS value to the UE.

In a sixth possible embodiment, with reference to the fourth possible embodiment of the second aspect, the first MDDT is less than or equal to the MDDT corresponding to the UE, the second MDDT is less than or equal to the MDDT corresponding to the UE, and the first MDDT is greater than or equal to the second MDDT; and when the first MDDT is greater than the second MDDT, the first IS value is less than the second IS value, and that a sum of the first MDDT and the first IS value equals a sum of the second MDDT and the second IS value is satisfied.

In a seventh possible embodiment, with reference to the second aspect or any one of the foregoing possible embodiments of the second aspect, the changing module further includes a stopping unit, where when the apparatus is in the second idle state, the stopping unit is configured to: when the receiving module receives signaling that triggers receiving of mobile originated MO sent by the UE, stop the second IST and inform the changing unit that the second IST is stopped because the UE sends the MO;

the changing unit is further configured to: on a basis that the stopping unit informs the changing unit that the second IST is stopped because the UE sends the MO, change the second idle state to the second active state, and provide, to the receiving module, a message carrying that the second idle state is changed to the second active state; and the receiving module is further configured to receive the MO when the second idle state is changed to the second active state.

In an eighth possible embodiment, with reference to the sixth possible embodiment of the second aspect, when the apparatus is in the second SLM state, the stopping unit is further configured to: when the receiving module receives signaling that triggers receiving of mobile originated MO sent by the UE, stop the second MDDT and inform the changing unit that the second MDDT is stopped because the UE sends the MO;

the changing unit is further configured to: on a basis that the stopping unit informs the changing unit that the second MDDT is stopped because the UE sends the MO, change the second SLM state to the second active state, and provide, to the receiving module, a message carrying that the second SLM state is changed to the second active state; and the receiving module is further configured to receive the MO when the second SLM state is changed to the second active state.

In an ninth possible embodiment, with reference to the second aspect or any one of the foregoing possible embodiments of the second aspect, the acquiring module is further configured to acquire an MUDT corresponding to the UE that is sent by the UE, and provide the MUDT corresponding to the UE to the determining module;

the determining module is further configured to determine an MUDT by using the MUDT corresponding to the UE, and provide the MUDT to the sending module, where the MUDT indicates a maximum delay tolerance value corresponding to processing, by the UE, uplink data of all the services on the UE; and the sending module is further configured to send the MUDT to the UE.

According to a third aspect, an embodiment of the present invention provides another data processing apparatus, including:

a memory, configured to store information including a program instruction;

a transceiver, configured to acquire a first maximum downlink delay tolerance MDDT sent by a core network entity, and provide the first MDDT to a processor, where the first MDDT indicates a maximum delay tolerance value corresponding to processing, by the apparatus, downlink data of all services on the apparatus; and the processor, coupled with the memory and the transceiver, configured to control execution of a program routine, and specifically configured to: determine time information of a first MDDT timer by using the first MDDT, where the time information of the first MDDT timer includes start time and end time of a UE status corresponding to the first MDDT; and change the UE status according to the time information of the first MDDT timer.

In a first possible embodiment, with reference to the third aspect, the transceiver is further configured to acquire a first idle state IS value sent by the core network entity, and provide the first IS value to the processor, where the first IS value is duration when the apparatus is in an idle state; and the processor is further configured to: determine time information of a first idle state timer IST by using the first IS value, where the time information of the first IST includes start time and end time of a UE status corresponding to the first IS value; and change the UE status according to the time information of the first IST.

In a second possible embodiment, with reference to the third aspect or the first possible embodiment of the third aspect, the processor is specifically configured to:

after the apparatus in a first active state completes data sending/receiving processing, start the first MDDT timer and change the first active state to a first sleep mode SLM state at start time of the first MDDT timer, where the first active state is a state in which the apparatus sends/receives data, and the first SLM state is a state in which the apparatus stops listening on a network and forbids receiving downlink data; and at end time of the first IST, start the first MDDT timer and change the first idle state to the first SLM state at the start time of the first MDDT timer.

In a third possible embodiment, with reference to the second possible embodiment of the third aspect, the processor is further configured to start the first IST at end time of the first MDDT timer, and change the first SLM state to the first idle state at start time of the first IST, where the first idle state is a state in which the apparatus listens on the network in a discontinuous reception DRX manner.

In a fourth possible embodiment, with reference to the third aspect or any one of the foregoing possible embodiments of the third aspect, the transceiver is further configured to acquire a maximum uplink delay tolerance MUDT sent by the core network entity, where the MUDT indicates a maximum delay tolerance value corresponding to processing, by the apparatus, uplink data of all the services on the apparatus.

In a fifth possible embodiment, with reference to the third aspect or any one of the foregoing possible embodiments of the third aspect, the transceiver is further configured to acquire mobile originated MO or receive a downlink paging signal, initiate a network access signal, and inform the processor that the MO is acquired or the network access signal is initiated, where the MO includes MO data and MO signaling;

the processor is further configured to:

when the apparatus is in the first idle state, and the apparatus initiates the MO or the transceiver initiates the network access signal, stop the first IST, change the first idle state to the first active state, and process initiation of the MO or process an operation of accessing the network; and when the apparatus is in the first SLM state and the apparatus initiates the MO, process initiation of the MO according to a preset manner; and the transceiver is further configured to execute initiation of the MO according to a preset manner when the apparatus is in the first SLM state and the apparatus initiates the MO.

In a sixth possible embodiment, with reference to the fifth possible embodiment of the third aspect, the processor is further configured to: when the apparatus is in the first SLM state, and the apparatus initiates the MO data, stop the first MDDT timer; and when the apparatus needs to send the MO signaling, stop the first MDDT timer, change the first SLM state to the first active state, and process initiation of the MO data; and the transceiver is further configured to execute initiation of the MO data when the processor changes the first SLM state to the first active state.

In a seventh possible embodiment, with reference to the sixth possible embodiment of the third aspect, the transceiver is further configured to: when the apparatus is in the first SLM state and the apparatus initiates the MO data, acquire an MUDT corresponding to the MO data, and provide the MUDT corresponding to the MO data to the processor;

the processor is further configured to:

compare the MUDT with remaining time that is set for the first MDDT timer, and when the MUDT is less than the remaining time that is set for the first MDDT timer, stop the first MDDT timer, change the first SLM state to the first active state, and provide, to the transceiver, a message carrying that the first SLM state is changed to the first active state; and when the MUDT is greater than or equal to the remaining time that is set for the first MDDT timer, wait until time that is set for the first MDDT timer expires, change the first SLM state to the first active state, and provide, to the transceiver, a message carrying that the first SLM state is changed to the first active state; and the transceiver is further configured to execute initiation of the MO data when the processor changes the first SLM state to the first active state.

In an eighth possible embodiment, with reference to the third aspect or any one of the foregoing possible embodiments of the third aspect, the transceiver is further configured to send, to the core network entity, an MDDT corresponding to the apparatus or an MDDT corresponding to each service on the apparatus, where both the MDDT corresponding to the apparatus and the MDDT corresponding to each service on the apparatus are bases for obtaining the first MDDT; and/or the transceiver is further configured to send, to the core network entity, an IS value corresponding to the apparatus, where the IS value corresponding to the apparatus is a basis for obtaining the first IS value.

In a ninth possible embodiment, with reference to the third aspect or any one of the foregoing possible embodiments of the third aspect, the first MDDT is less than or equal to the MDDT corresponding to the apparatus, a second MDDT is less than or equal to the MDDT corresponding to the apparatus, and the first MDDT is greater than or equal to the second MDDT, where the second MDDT indicates a maximum delay tolerance value corresponding to processing, by the core network entity, the downlink data of all the services on the apparatus; and when the first MDDT is greater than the second MDDT, the first IS value is less than a second IS value, and that a sum of the first MDDT and the first IS value equals a sum of the second MDDT and the second IS value is satisfied, where the second IS value is duration when the core network entity is in an idle state when processing all the services on the apparatus.

In a tenth possible embodiment, with reference to the third aspect or any one of the foregoing possible embodiments of the third aspect, the first SLM state is a state in which the apparatus stops listening on the network and forbids sending uplink data and receiving downlink data.

According to a fourth aspect, an embodiment of the present invention provides another data processing apparatus, including:

a memory, configured to store information including a program instruction;

a processor, coupled with the memory, configured to control execution of a program routine, and specifically configured to: determine a second maximum downlink delay tolerance MDDT, where the second MDDT indicates a maximum delay tolerance value corresponding to processing, by the apparatus, downlink data of all services on a user equipment UE, and the UE is any user equipment managed by the apparatus; determine time information of a second MDDT timer by using the second MDDT, where the time information of the second MDDT timer includes start time and end time of a core network entity status corresponding to the second MDDT; and change the core network entity status according to the time information of the second MDDT timer.

In a first possible embodiment, with reference to the fourth aspect, the processor is further configured to: determine a second idle state IS value, where the second IS value is duration when the apparatus is in an idle state when processing all the services on the UE; determine time information of a second idle state timer IST by using the second IS value, where the time information of the second IST includes start time and end time of a core network entity status corresponding to the second IS value; and change the core network entity status according to the time information of the second IST timer.

In a second possible embodiment, with reference to the fourth aspect or the first possible embodiment of the fourth aspect, the processor is specifically configured to:

after the apparatus in a second active state completes sending/receiving processing on data of the UE, start the second MDDT timer, and change the second active state to a second sleep mode SLM state at start time of the second MDDT timer, where the second active state is a state in which the apparatus sends/receives data of the UE, and the second SLM state is a state in which sending downlink data of the UE is forbidden; and start the second MDDT timer at end time of the second IST, and change a second idle state to the second SLM state at the start time of the second MDDT timer.

In a third possible embodiment, with reference to the second possible embodiment of the fourth aspect, the processor is further configured to start the second IST at end time of the second MDDT timer, and change the second SLM state to the second idle state at start time of the second IST, where the second idle state is a state in which the apparatus sends paging information to the UE in a discontinuous reception DRX manner.

In a fourth possible embodiment, with reference to the fourth aspect or any one of the foregoing possible embodiments of the fourth aspect, the apparatus further includes: a transceiver, where:

the transceiver is configured to: receive an MDDT corresponding to the UE that is sent by the UE; or receive an MDDT corresponding to each service on the UE that is sent by the UE, and provide the MDDT corresponding to each service on the UE to the processor; receive an IS value corresponding to the UE that is sent by the UE; or acquire, from a home subscriber server HSS, an MDDT corresponding to the UE or an IS value corresponding to the UE; and the processor is further configured to determine, by using the MDDT corresponding to each service on the UE, the MDDT corresponding to the UE, and set the IS value corresponding to the UE.

In a fifth possible embodiment, with reference to the fourth possible embodiment of the fourth aspect, the processor is further configured to: determine a first MDDT and the second MDDT by using the MDDT corresponding to the UE, where the first MDDT indicates a maximum delay tolerance value corresponding to processing, by the UE, the downlink data of all the services on the UE; determine a first IS value and the second IS value by using the IS corresponding to the UE, where the first IS value is duration when the UE is in an idle state; and provide the first MDDT and the first IS value to the transceiver; and the transceiver is further configured to send the first MDDT and the first IS value to the UE.

In a sixth possible embodiment, with reference to the fifth possible embodiment of the fourth aspect, the first MDDT is less than or equal to the MDDT corresponding to the UE, the second MDDT is less than or equal to the MDDT corresponding to the UE, and the first MDDT is greater than or equal to the second MDDT; and when the first MDDT is greater than the second MDDT, the first IS value is less than the second IS value, and that a sum of the first MDDT and the first IS value equals a sum of the second MDDT and the second IS value is satisfied.

In a seventh possible embodiment, with reference to the fourth aspect or any one of the foregoing possible embodiments of the fourth aspect, the processor is further configured to: when the apparatus is in the second idle state and the transceiver receives signaling that triggers receiving of mobile originated MO sent by the UE, stop the second IST, change the second idle state to the second active state, and provide, to the transceiver, a message carrying that the second idle state is changed to the second active state; and the transceiver is further configured to receive the MO when the second idle state is changed to the second active state.

In an eighth possible embodiment, with reference to the seventh possible embodiment of the fourth aspect, the processor is further configured to: when the apparatus is in the second SLM state and the transceiver receives signaling that triggers receiving of mobile originated MO sent by the UE, stop the second MDDT, change the second SLM state to the second active state, and provide, to the transceiver, a message carrying that the second SLM state is changed to the second active state; and the transceiver is further configured to receive the MO when the second SLM state is changed to the second active state.

In a ninth possible embodiment, with reference to the fourth aspect or any one of the foregoing possible embodiments of the fourth aspect, the transceiver is further configured to acquire an MUDT corresponding to the UE that is sent by the UE, and provide the MUDT corresponding to the UE to the processor;

the processor is further configured to determine an MUDT by using the MUDT corresponding to the UE, and provide the MUDT to the transceiver, where the MUDT indicates a maximum delay tolerance value corresponding to processing, by the UE, uplink data of all the services on the UE; and the transceiver is further configured to send the MUDT to the UE.

According to a fifth aspect, an embodiment of the present invention provides a data processing method, including:

acquiring, by a user equipment UE, a first maximum downlink delay tolerance MDDT sent by a core network entity, where the first MDDT indicates a maximum delay tolerance value corresponding to processing, by the UE, downlink data of all services on the UE;

determining, by the UE, time information of a first MDDT timer by using the first MDDT, where the time information of the first MDDT timer includes start time and end time of a UE status corresponding to the first MDDT; and changing, by the UE, the UE status according to the time information of the first MDDT timer.

In a first possible embodiment, with reference to the fifth aspect, the method further includes:

acquiring, by the UE, a first idle state IS value sent by the core network entity, where the first IS value is duration when the UE is in an idle state;

determining, by the UE, time information of a first idle state timer IST by using the first IS value, where the time information of the first IST includes start time and end time of a UE status corresponding to the first IS value; and changing, by the UE, the UE status according to the time information of the first IST.

In a second possible embodiment, with reference to the fifth aspect or the first possible embodiment of the fifth aspect, the UE status includes a first active state and a first sleep mode SLM state; and the changing, by the UE, the UE status according to the time information of the first MDDT timer includes:

after the UE in the first active state completes data sending/receiving processing, starting, by the UE, the first MDDT timer, and changing the first active state to the first SLM state at start time of the first MDDT timer, where the first active state is a state in which the UE sends/receives data, and the first SLM state is a state in which the UE stops listening on a network and forbids receiving downlink data; and starting, by the UE, the first MDDT timer at end time of the first IST, and changing a first idle state to the first SLM state at the start time of the first MDDT timer.

In a third possible embodiment, with reference to the second possible embodiment of the fifth aspect, the UE status further includes the first idle state; and the changing, by the UE, the UE status according to the time information of the first IST includes:

starting, by the UE, the first IST at end time of the first MDDT timer, and changing the first SLM state to the first idle state at start time of the first IST, where the first idle state is a state in which the UE listens on the network in a discontinuous reception DRX manner.

In a fourth possible embodiment, with reference to the fifth aspect or any one of the foregoing possible embodiments of the fifth aspect, the method further includes:

acquiring, by the UE, a maximum uplink delay tolerance MUDT sent by the core network entity, where the MUDT indicates a maximum delay tolerance value corresponding to processing, by the UE, uplink data of all the services on the UE.

In a fifth possible embodiment, with reference to the fifth aspect or any one of the foregoing possible embodiments of the fifth aspect, the method further includes:

when the UE is in the first idle state, and the UE initiates mobile originated MO or the UE receives a downlink paging signal and initiates a network access signal, stopping, by the UE, the first IST, changing the first idle state to the first active state, and executing initiation of the MO or performing an operation of accessing the network; and executing, by the UE, initiation of the MO according to a preset manner when the UE is in the first SLM state and the UE initiates the MO.

In a sixth possible embodiment, with reference to the fifth possible embodiment of the fifth aspect, the MO includes MO data and MO signaling, and the executing, by the UE, initiation of the MO according to a preset manner when the UE is in the first SLM state and the UE initiates the mobile originated MO includes:

when the UE is in the first SLM state and the UE initiates the MO data, stopping, by the UE, the first MDDT timer, changing the first SLM state to the first active state, and executing initiation of the MO data; or when the UE initiates the MO data, acquiring, by the UE, an MUDT corresponding to the MO data; comparing the MUDT with remaining time that is set for the first MDDT timer; when the MUDT is less than the remaining time that is set for the first MDDT timer, stopping, by the UE, the first MDDT timer, changing the first SLM state to the first active state, and executing initiation of the MO data; and when the MUDT is greater than or equal to the remaining time that is set for the first MDDT timer, waiting, by the UE, until time that is set for the first MDDT timer expires, changing, by the UE, the first SLM state to the first active state at the end time of the first MDDT timer, and executing initiation of the MO data; or when the UE sends the MO signaling, stopping, by the UE, the first MDDT timer, changing the first SLM state to the first active state, and executing initiation of the MO signaling.

In a seventh possible embodiment, with reference to the fifth aspect or any one of the foregoing possible embodiments of the fifth aspect, before the acquiring, by a user equipment UE, a first maximum downlink delay tolerance MDDT and a first idle state IS value that are sent by a core network entity, the method further includes:

sending, by the UE to the core network entity, an MDDT corresponding to the UE or an MDDT corresponding to each service on the UE, where both the MDDT corresponding to the UE and the MDDT corresponding to each service on the UE are bases for obtaining the first MDDT; and/or sending, by the UE to the core network entity, an IS value corresponding to the UE, where the IS value corresponding to the UE is a basis for obtaining the first IS value.

In an eighth possible embodiment, with reference to the fifth aspect or any one of the foregoing embodiments of the fifth aspect, the first MDDT is less than or equal to the MDDT corresponding to the UE, a second MDDT is less than or equal to the MDDT corresponding to the UE, and the first MDDT is greater than or equal to the second MDDT, where the second MDDT indicates a maximum delay tolerance value corresponding to processing, by the core network entity, the downlink data of all the services on the UE; and when the first MDDT is greater than the second MDDT, the first IS value is less than a second IS value, and that a sum of the first MDDT and the first IS value equals a sum of the second MDDT and the second IS value is satisfied, where the second IS value is duration when the core network entity is in an idle state when processing all the services on the UE.

In a ninth possible embodiment, with reference to the fifth aspect or any one of the foregoing possible embodiments of the fifth aspect, the first SLM state is a state in which the UE stops listening on the network and forbids sending uplink data and receiving downlink data.

According to a sixth aspect, an embodiment of the present invention provides another data processing method, including:

determining, by a core network entity, a second maximum downlink delay tolerance MDDT, where the second MDDT indicates a maximum delay tolerance value corresponding to processing, by the core network entity, downlink data of all services on a user equipment UE, and the UE is any user equipment managed by the core network entity;

determining, by the core network entity, time information of a second MDDT timer by using the second MDDT, where the time information of the second MDDT timer includes start time and end time of a core network entity status corresponding to the second MDDT; and changing, by the core network entity, the core network entity status according to the time information of the second MDDT timer.

In a first possible embodiment, with reference to the sixth aspect, the method further includes:

determining, by the core network entity, a second idle state IS value, where the second IS value is duration when the core network entity is in an idle state when processing all the services on the UE;

determining, by the core network entity, time information of a second idle state timer IST by using the second IS value, where the time information of the second IST includes start time and end time of a core network entity status corresponding to the second IS value; and changing, by the core network entity, the core network entity status according to the time information of the second IST timer.

In a second possible embodiment, with reference to the sixth aspect or the first possible embodiment of the sixth aspect, the core network entity status includes a second active state and a second sleep mode SLM state; and the changing, by the core network entity, the core network entity status according to the time information of the second MDDT timer includes:

after the core network entity in the second active state completes sending/receiving processing on data of the UE, starting, by the core network entity, the second MDDT timer, and changing the second active state to the second SLM state at start time of the second MDDT timer, where the second active state is a state in which the core network entity sends/receives the data of the UE, and the second SLM state is a state in which sending downlink data of the UE is forbidden; and starting, by the core network entity, the second MDDT timer at end time of the second IST, and changing a second idle state to the second SLM state at the start time of the second MDDT timer.

In a third possible embodiment, with reference to the second possible embodiment of the sixth aspect, the core network entity status further includes the second idle state; and the changing, by the core network entity, the core network entity status according to the time information of the second IST timer includes:

starting, by the core network entity, the second IST at end time of the second MDDT timer, and changing the second SLM state to the second idle state at start time of the second IST, where the second idle state is a state in which the core network entity sends paging information to the UE in a discontinuous reception DRX manner.

In a fourth possible embodiment, with reference to the sixth aspect or any one of the foregoing possible embodiments of the sixth aspect, the method further includes:

receiving, by the core network entity, an MDDT corresponding to the UE that is sent by the UE; or receiving an MDDT corresponding to each service on the UE that is sent by the UE, and determining an MDDT corresponding to the UE by using the MDDT corresponding to each service on the UE; or acquiring, from a home subscriber server HSS, an MDDT corresponding to the UE; and/or receiving, by the core network entity, an IS value corresponding to the UE that is sent by the UE; or setting an IS value corresponding to the UE; or acquiring, from a home subscriber server HSS, an IS value corresponding to the UE.

In a fifth possible embodiment, with reference to the fourth possible embodiment of the sixth aspect, the method further includes:

determining, by the core network entity, a first MDDT and the second MDDT by using the MDDT corresponding to the UE, where the first MDDT indicates a maximum delay tolerance value corresponding to processing, by the UE, the downlink data of all the services on the UE;

determining, by the core network entity, a first IS value and the second IS value by using the IS value corresponding to the UE, where the first IS value is duration when the UE is in an idle state; and sending, by the core network entity, the first MDDT and the first IS value to the UE.

In a sixth possible embodiment, with reference to the fifth possible embodiment of the sixth aspect, the first MDDT is less than or equal to the MDDT corresponding to the UE, the second MDDT is less than or equal to the MDDT corresponding to the UE, and the first MDDT is greater than or equal to the second MDDT; and when the first MDDT is greater than the second MDDT, the first IS value is less than the second IS value, and that a sum of the first MDDT and the first IS value equals a sum of the second MDDT and the second IS value is satisfied.

In a seventh possible embodiment, with reference to the sixth aspect or any one of the foregoing possible embodiments of the sixth aspect, the method further includes:

when the core network entity is in the second idle state, and when the core network entity receives mobile originated MO sent by the UE, stopping, by the core network entity, the second IST, changing the second idle state to the second active state, and receiving the MO; and when the core network entity is in the second SLM state, and when the core network entity receives mobile originated MO sent by the UE, stopping, by the core network entity, the second MDDT timer, changing the second SLM state to the second active state, and receiving the MO.

In an eighth possible embodiment, with reference to the sixth aspect or any one of the foregoing possible embodiments of the sixth aspect, the method further includes:

acquiring, by the core network entity, an MUDT corresponding to the UE that is sent by the UE;

determining, by the core network entity, an MUDT by using the MUDT corresponding to the UE, where the MUDT indicates a maximum delay tolerance value corresponding to processing, by the UE, uplink data of all the services on the UE; and sending, by the core network entity, the MUDT to the UE.

In the data processing apparatus and method provided by the embodiments of the present invention, an acquiring module acquires a first maximum downlink delay tolerance MDDT and a first idle state IS value that are sent by a core network entity, and provides the first MDDT and the first IS value to a determining module, where the first MDDT indicates a maximum delay tolerance value corresponding to processing, by the apparatus, downlink data of all services on the apparatus, and the first IS value is duration when the apparatus is in an idle state; the determining module determines time information of a first MDDT timer by using the first MDDT, and determines time information of a first idle state timer IST by using the first IS value; and a changing module changes a UE status according to the time information of the first MDDT timer or changes a UE status according to the time information of the first IST. In the prior art, the following method is used to achieve power saving for a UE: states in which a UE corresponding to a delay-insensitive service is connected to a network are classified into an active state and an idle state, and in the idle state, the UE listens on the network according to a constant PO period. However, when there is a significant difference between an interval at which the UE receives downlink data and an interval of the PO period, a problem of unnecessary power consumption of the UE arises. In comparison with this method in the prior art, the present invention may use a maximum downlink delay tolerance corresponding to each service on a UE to minimize time during which the UE is in an idle state, thereby reducing power consumption of the UE.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 7 is a structural diagram of hardware of a core network entity in a data processing system according to an embodiment of the present invention;

FIG. 8(a) is a flowchart of a data processing method according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
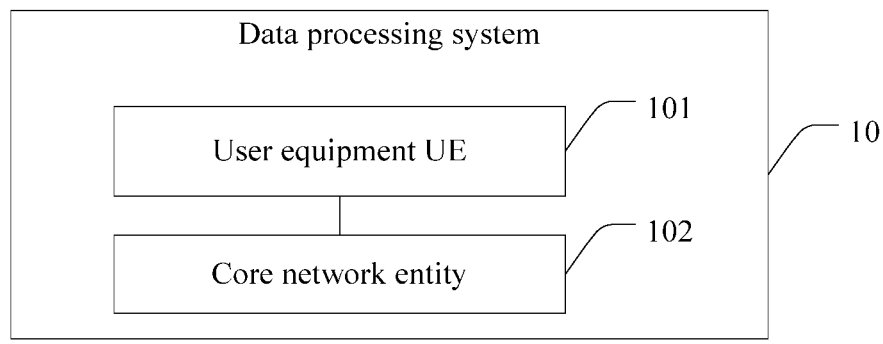
FIG. 1 is a schematic structural diagram of a data processing system according to an embodiment of the present invention.

As shown in FIG. 1, the present invention is applicable to a data processing system 10, where the system 10 may include a UE 101 and a core network entity 102. Both the UE 101 and the core network entity 102 in the system 10 have an active state, an idle state, and a sleep mode (SLM) state.

It should be noted that, in the active state: the UE 101 exchanges data (uplink data and/or downlink data) with the core network entity 102. Further:

In the idle state, the UE 101 listens on a network in a DRX manner for determining whether there is a paging message (a paging message is one type of downlink data), and performs cell measurement continuously; the core network entity 102 may send a paging message and receive possible uplink data of the UE 101 (for example, mobile originated (MO)).

In the SLM state, the UE 101 stops listening on the network and forbids receiving downlink data; the core network entity 102 forbids sending downlink data of the UE 101. Specifically, the UE 101 in the SLM state does not listen on any downlink data (including a paging message, a broadcast message, and the like) or measure cell information.

For ease of description, for the UE 101, states may be classified into a first active state, a first idle state, and a first SLM state; for the core network entity 102, states may be classified into a second active state, a second idle state, and a second SLM state.

A specific form of the UE 101 in the system 10 is not limited, for example, a water meter, an electricity meter, a gas meter, and an environmental monitoring device. The system 10 is applicable to a System Architecture Evolution (SAE)/Long Term Evolution (LTE) cellular network, 2G/3G, Worldwide Interoperability for Microwave Access (WiMAX), Code Division Multiple Access (CDMA), and other cellular networks. In addition, it may be understood that the core network entity 102 is different devices in different cellular networks. For example, in the SAE/LTE cellular network, the core network entity 102 may be a mobility management entity (MME); in the 2G/3G cellular network, the core network entity 102 may be a serving general packet radio service support node (SGSN).

Specifically, the UE 101 is configured to acquire a first maximum downlink delay tolerance (MDDT) sent by the core network entity 102, where the first MDDT indicates a maximum delay tolerance value corresponding to processing, by the UE 101, downlink data of all services on the UE 101.

Specifically, the UE 101 may determine time information of a first MDDT timer by using the first MDDT, where the time information of the first MDDT timer includes start time and end time of a UE status corresponding to the first MDDT, and change the UE status according to the time information of the first MDDT timer.

The core network entity 102 is configured to acquire a second MDDT, where the second MDDT indicates a maximum delay tolerance value corresponding to processing, by the core network entity 102, the downlink data of all the services on the UE 101; and specifically:

the core network entity 102 determines time information of a second MDDT timer by using the second MDDT, where the time information of the second MDDT timer includes start time and end time of a core network entity status corresponding to the second MDDT, and changes the core network entity status according to the time information of the second MDDT timer.

It should be noted that, in the present invention, the UE 101 is any user equipment managed by the core network entity 102.

Further optionally, the UE 101 may further determine time information of a first idle state timer (IST) by using a first IS value, where the time information of the first IST includes start time and end time of a UE status corresponding to the first IS value, and change the UE status according to the time information of the first IST.

The core network entity 102 is further configured to acquire a second IS value, where the second IS value is duration when the core network entity 102 is in an idle state when processing all the services on the UE 101; and specifically:

the core network entity 102 determines time information of a second IST by using the second IS value, where the time information of the second IST includes start time and end time of a core network entity status corresponding to the second IS value, and changes the core network entity status according to the time information of the second IST timer.

The present invention may use a maximum downlink delay tolerance corresponding to each service on a UE to minimize time during which the UE is in an idle state, thereby reducing power consumption of the UE.

Figure 2:
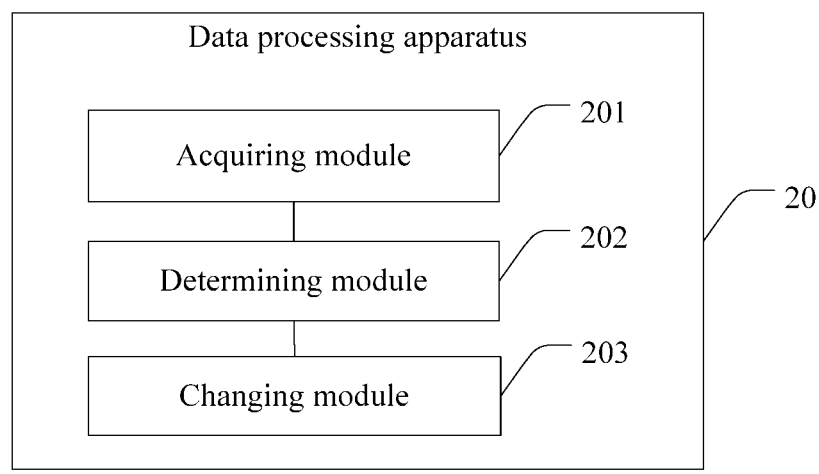
FIG. 2 is a schematic structural diagram of a data processing apparatus according to an embodiment of the present invention.

With reference to FIG. 1, the present invention provides a data processing apparatus 20. As shown in FIG. 2, the apparatus 20 may include: an acquiring module 201, a determining module 202, and a changing module 203. Specifically, the apparatus 20 may be the UE 101 in FIG. 1.

The acquiring module 201 is configured to acquire a first MDDT sent by a core network entity, and provide the first MDDT to the determining module 202, where the first MDDT indicates a maximum delay tolerance value corresponding to processing downlink data of all services on the data processing apparatus.

The determining module 202 is configured to determine time information of a first MDDT timer by using the first MDDT provided by the acquiring module 201, where the time information of the first MDDT timer includes start time and end time of a UE status corresponding to the first MDDT.

The changing module 203 is configured to change the UE status according to the time information of the first MDDT timer determined by the determining module 202.

In the data processing apparatus provided by the embodiment of the present invention, a maximum downlink delay tolerance corresponding to each service on a UE is used to minimize time during which the UE is in an idle state, which solves a problem of high power consumption of the UE. In the prior art, the following method is used to achieve power saving for a UE: states in which a UE corresponding to a delay-insensitive service is connected to a network are classified into an active state and an idle state, and in the idle state, the UE listens on the network according to a constant PO period. However, when there is a significant difference between an interval at which the UE receives downlink data and an interval of the PO period, a problem of unnecessary power consumption of the UE arises. In comparison with this method in the prior art, the data processing apparatus in the embodiment of the present invention can reduce power consumption of the UE.

For example, a service only needs to receive downlink data once per hour (60 min), whereas a UE in the idle state listens on a network in a DRX manner all the time, and the UE changes the idle state to the active state after 60 min, and receives uplink data. Therefore, power consumption of the UE increases.

Further optionally, the acquiring module 201 is further configured to acquire a first IS value sent by the core network entity, and provide the first IS value to the determining module 202, where the first IS value is duration when the data processing apparatus is in an idle state.

The determining module 202 is further configured to determine time information of a first idle state timer IST by using the first IS value provided by the acquiring module 201, where the time information of the first IST includes start time and end time of a UE status corresponding to the first IS value.

The changing module 203 is configured to change the UE status according to the time information of the first IST determined by the determining module 202.

Figure 3:
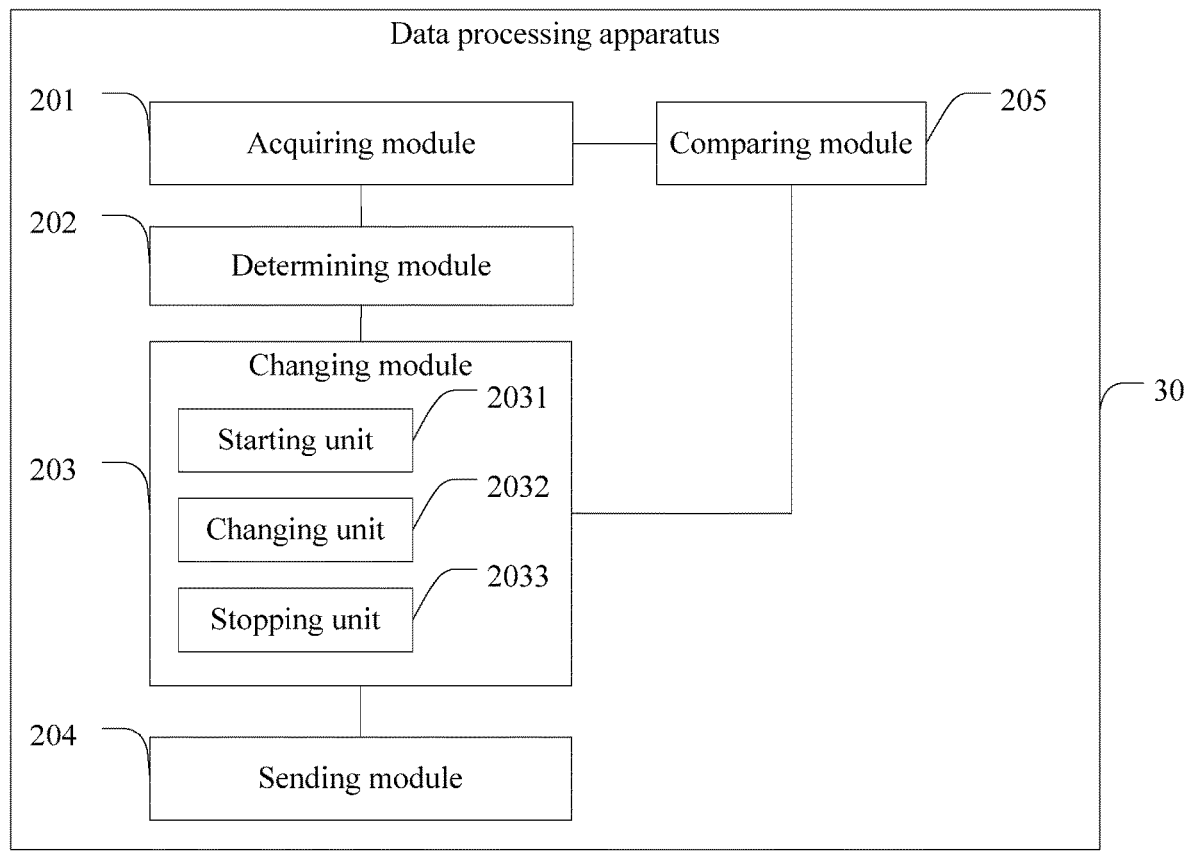
FIG. 3 is a schematic structural diagram of another data processing apparatus according to an embodiment of the present invention.

Further, the present invention further provides a data processing apparatus 30. As shown in FIG. 3, the changing module 203 may further include a starting unit 2301, a changing unit 2032, and a stopping unit 2033.

It should be noted firstly that the UE status includes a first active state, a first idle state, and a first SLM state.

That the changing module 203 changes the UE status according to the time information of the first MDDT timer determined by the determining module 202 or changes the UE status according to the time information of the first IST determined by the determining module 202 includes:

the starting unit 2031, configured to: after the apparatus in the first active state completes data sending/receiving processing, start the first MDDT timer, and inform the changing unit 2032 at start time of the first MDDT timer that the first MDDT timer is started; and the changing unit 2032, configured to: when the apparatus is in the first active state and learns that the starting unit 2031 has started the first MDDT timer, change the first active state to the first SLM state at the start time of the first MDDT timer, where the first active state is a state in which the apparatus sends/receives data, and the first SLM state is a state in which the apparatus stops listening on a network and forbids receiving downlink data; or the starting unit 2031, configured to start the first IST at end time of the first MDDT timer, and inform the changing unit 2032 at start time of the first IST that the first IST is started; and the changing unit 2032, configured to: when the apparatus is in the first SLM state and learns that the starting unit 2031 has started the first IST, change the first SLM state to the first idle state at the start time of the first IST, where the first idle state is a state in which the apparatus listens on a network in a discontinuous reception DRX manner; or the starting unit 2031, configured to start the first MDDT timer at end time of the first IST, and inform the changing unit 2032 at start time of the first MDDT timer that the first MDDT timer is started; and the changing unit 2032, configured to: when the apparatus is in the first idle state and learns that the starting unit 2031 has started the first MDDT timer, change the first idle state to the first SLM state at the start time of the first MDDT timer.

It should be noted herein that, when the apparatus 30 changes the first SLM state to the first idle state, the end time of the first MDDT is the start time of the first IST; when the apparatus 30 changes the first idle state to the first SLM state, the end time of the first IST is the start time of the first MDDT.

Further optionally, the acquiring module 201 is further configured to acquire an MUDT sent by the core network entity, where the MUDT indicates a maximum delay tolerance value corresponding to processing, by the apparatus 30, uplink data of all the services on the apparatus 30.

Further optionally, the acquiring module 201 is further configured to acquire MO or receive a downlink paging signal, provide information about the MO or the received downlink paging signal to a sending module 204, and inform the stopping unit 2033 in the changing module 203 of a message that the MO is acquired.

When the acquiring module 201 receives the downlink paging signal, the sending module 204 initiates a network access signal, and informs the stopping unit 2033 that the network access signal is initiated.

When the apparatus is in the first idle state, and the apparatus initiates the MO or the sending module 204 has initiated the network access signal, the stopping unit 2033 stops the first IST and informs the changing unit 2032 that the first IST is stopped because of the MO. On a basis that the stopping unit 2033 informs the changing unit 2032 that the first IST is stopped because of the MO, the changing unit 2032 changes the first idle state to the first active state, and provides, to the sending module 204, a message carrying that the first idle state is changed to the first active state; and then the sending module 204 executes initiation of the MO.

Further, the sending module 204 is further configured to execute initiation of the MO according to a preset manner when the apparatus is in the first SLM state and the apparatus initiates the MO.

It should be noted that the MO includes MO data and MO signaling.

When the apparatus 30 is in the first SLM state, and the apparatus 30 initiates the MO data, the stopping unit 2033 stops the first MDDT timer and informs the changing unit 2032 that the first MDDT timer is stopped because of the MO data; when the apparatus 30 needs to send the MO signaling, the stopping unit 2033 stops the first MDDT timer and informs the changing unit 2032 that the first MDDT timer is stopped because of the MO signaling. Then on a basis that the stopping unit 2033 informs the changing unit 2032 that the first MDDT timer is stopped because of the MO data or the MO signaling, the changing unit 2032 changes the first SLM state to the first active state, and provides, to the sending module 204, a message carrying that the first SLM state is changed to the first active state. When the changing unit 2032 changes the first SLM state to the first active state, the sending module 204 executes initiation of the MO data.

Further, the apparatus 30 further includes the sending module 204 and a comparing module 205.

When the apparatus 30 initiates the MO data, the acquiring module 201 is further configured to acquire an MUDT corresponding to the MO data, and provide the MUDT corresponding to the MO data to the comparing module 205. The comparing module 205 compares the MUDT with remaining time that is set for the first MDDT timer, and provides a comparison result to the stopping unit 2033.

When the MUDT is less than the remaining time that is set for the first MDDT timer, the stopping unit 2033 stops the first MDDT timer, and informs the changing unit 2032 that the first MDDT timer is stopped because the MUDT is less than the remaining time that is set for the first MDDT timer. Then, on a basis that the stopping unit 2033 informs the changing unit 2032 that the first MDDT timer is stopped because the MUDT is less than the remaining time that is set for the first MDDT timer, the changing unit 2032 changes the first SLM state to the first active state, and provides, to the sending module 204, a message carrying that the first SLM state is changed to the first active state.

When the MUDT is greater than or equal to the remaining time that is set for the first MDDT timer, the changing unit 2032 waits until time that is set for the first MDDT timer expires, and changes the first SLM state to the first active state. When the changing unit 2032 changes the first SLM state to the first active state, the sending module 204 executes initiation of the MO data.

Further optionally, before the acquiring module 201 acquires the first MDDT and the first IS value, the sending module 204 sends, to the core network entity, an MDDT corresponding to the apparatus 30 or an MDDT corresponding to each service on the apparatus 30, where both the MDDT corresponding to the apparatus 30 and the MDDT corresponding to each service on the apparatus 30 are bases for obtaining the first MDDT; the sending module 204 sends, to the core network entity, an IS value corresponding to the apparatus 30, where the IS value corresponding to the apparatus 30 is a basis for obtaining the first IS value.

It should be further noted that the first MDDT may be less than or equal to the MDDT corresponding to the apparatus, a second MDDT may be less than or equal to the MDDT corresponding to the apparatus, and the first MDDT is greater than or equal to the second MDDT, where the second MDDT indicates a maximum delay tolerance value corresponding to processing, by the core network entity, the downlink data of all the services on the apparatus 30.

When the first MDDT is greater than the second MDDT, the first IS value is less than a second IS value, and that a sum of the first MDDT and the first IS value equals a sum of the second MDDT and the second IS value is satisfied, where the second IS value is duration when the core network entity is in an idle state when processing all the services on the apparatus 30.

Further optionally, the first SLM state may further be a state in which the apparatus 30 stops listening on the network and forbids sending uplink data and receiving downlink data.

Figure 4:
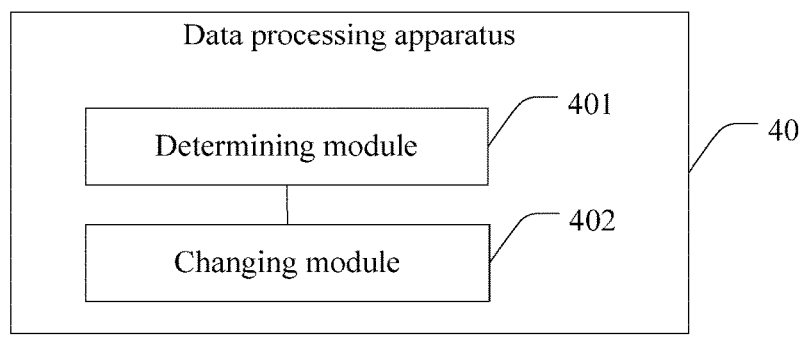
FIG. 4 is a schematic structural diagram of still another data processing apparatus according to an embodiment of the present invention.

With reference to FIG. 1, the present invention provides a data processing apparatus 40. As shown in FIG. 4, the apparatus 40 includes: a determining module 401 and a changing module 402. Specifically, the apparatus 40 may be the core network entity 102 in FIG. 1.

The determining module 401 is configured to: determine a second MDDT, where the second MDDT indicates a maximum delay tolerance value corresponding to processing, by the apparatus 40, downlink data of all services on a UE, and the UE is any user equipment managed by the apparatus 40; and determine time information of a second MDDT timer by using the second MDDT, where the time information of the second MDDT timer includes start time and end time of a core network entity status corresponding to the second MDDT.

The changing module 402 is configured to change the core network entity status according to the time information of the second MDDT timer determined by the determining module 401.

The present invention may use a maximum downlink delay tolerance corresponding to each service on a UE to minimize time during which the UE is in an idle state, so that a core network entity implements status synchronization with the UE and cooperates with the UE for power saving, and when the UE is in a first SLM state (sleep mode), the core network entity performs an operation, such as paging, on the UE within specific time, which prevents the core network entity from determining that the UE is in an unreachable state or in an abnormal shutdown state because the core network entity cannot obtain a response from the UE within preset time. In this way, power consumption of the UE is reduced and an objective of saving network resources (reducing sending of signaling) is achieved at the same time.

Further optionally, the determining module 401 is further configured to: determine a second IS value, where the second IS value is duration when the apparatus 40 is in an idle state when processing all the services on the UE; and determine time information of a second idle state timer IST by using the second IS value, where the time information of the second IST includes start time and end time of a core network entity status corresponding to the second IS value.

The changing module 402 is configured to change the core network entity status according to the time information of the second IST timer determined by the determining module 401.

Figure 5:
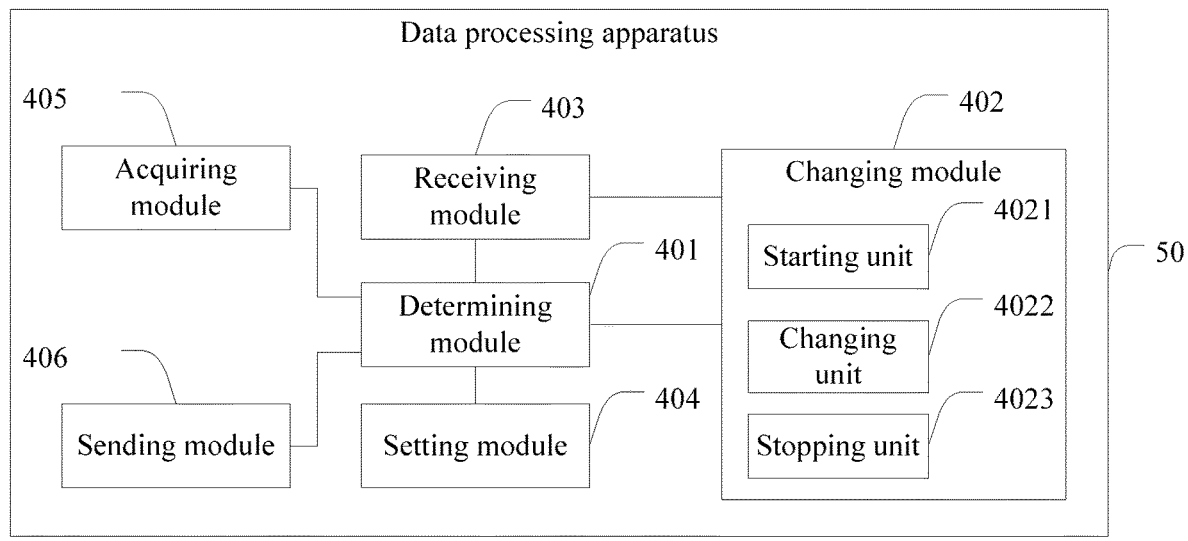
FIG. 5 is a schematic structural diagram of yet another data processing apparatus according to an embodiment of the present invention.

Further, the present invention further provides another data processing apparatus 50. As shown in FIG. 5, the changing module 402 in the apparatus 50 includes a starting unit 4021, a changing unit 4022, and a stopping unit 4023.

It should be noted firstly that the core network entity status includes a second active state, a second idle state, and a second SLM state.

That the changing module 402 changes the core network entity status according to the time information of the second MDDT timer or changes the core network entity status according to the time information of the second IST timer specifically includes:

After the apparatus 50 in the second active state completes sending/receiving processing on data of the UE, the starting unit 4021 starts the second MDDT timer, and informs the changing unit 4022 at start time of the second MDDT timer that the second MDDT timer is started. Correspondingly, when the apparatus 50 is in the second active state and learns that the starting unit 4021 has started the second MDDT timer, the changing unit 4022 changes the second active state to the second sleep mode SLM state at the start time of the second MDDT timer, where the second active state is a state in which the apparatus sends/receives the data of the UE, and the second SLM state is a state in which sending downlink data of the UE is forbidden.

The starting unit 4021 starts the second IST at end time of the second MDDT timer, and informs the changing unit 4022 at start time of the second IST that the second IST is started. Correspondingly, when the apparatus 50 is in the second SLM state and learns that the starting unit 4021 has started the second IST, the changing unit 4022 changes the second SLM state to the second idle state, where the second idle state is a state in which the apparatus sends paging information to the UE in a discontinuous reception DRX manner.

The starting unit 4021 starts the second MDDT timer at end time of the second IST, and the starting unit 4021 informs the changing unit 4022 at the start time of the second MDDT timer that the second MDDT timer is started. Correspondingly, when the apparatus 50 is in the second idle state and learns that the starting unit 4021 has started the second MDDT timer, the changing unit 4022 changes the second idle state to the second SLM state.

It should be noted herein that, when the apparatus 50 changes the second SLM state to the second idle state, the end time of the second MDDT is the start time of the second IST; when the apparatus 50 changes the second idle state to the second SLM state, the end time of the second IST is the start time of the second MDDT.

Further, the apparatus 50 further includes: a receiving module 403.

When the apparatus 50 is in the second idle state, and when the receiving module 403 receives signaling that triggers receiving of mobile originated MO sent by the UE, the stopping unit 4023 stops the second IST and informs the changing unit 4022 that the second IST is stopped because the UE sends the MO. Correspondingly, on a basis that the stopping unit 4023 informs the changing unit 4022 that the second IST is stopped because the UE sends the MO, the changing unit 4022 changes the second idle state to the second active state, and provides, to the receiving module 403, a message carrying that the second idle state is changed to the second active state.

Correspondingly, when the second idle state is changed to the second active state, the receiving module 403 receives the MO.

When the apparatus 50 is in the second SLM state, and when the receiving module 403 receives signaling that triggers receiving of mobile originated MO sent by the UE, the stopping unit 4023 stops the second MDDT and informs the changing unit 4022 that the second MDDT is stopped because the UE sends the MO. Correspondingly, on a basis that the stopping unit 4023 informs the changing unit 4022 that the second MDDT is stopped because the UE sends the MO, the changing unit 4022 changes the second SLM state to the second active state, and provides, to the receiving module 403, a message carrying that the second SLM state is changed to the second active state.

Correspondingly, when the second SLM state is changed to the second active state, the receiving module 403 receives the MO.

Further, the apparatus 50 further includes a setting module 404, an acquiring module 405, and a sending module 406.

Before the determining module 401 determines the second MDDT and the second IS value, the apparatus 50 needs to receive a basis for determining the second MDDT and the second IS value, which specifically includes the following manners:

A first manner: The receiving module 403 receives an MDDT corresponding to the UE that is sent by the UE; or receives an MDDT corresponding to each service on the UE that is sent by the UE, and provides the MDDT corresponding to each service on the UE to the determining module 401; and receives an IS value corresponding to the UE that is sent by the UE.

The determining module is configured to determine, by using the MDDT corresponding to each service on the UE, the MDDT corresponding to the UE.

Optionally, the setting module 404 sets the IS value corresponding to the UE.

Optionally, the acquiring module 405 acquires, from a home subscriber server HSS, the MDDT corresponding to the UE or the IS value corresponding to the UE.

It should be noted that the determining module 401 is further configured to: determine a first MDDT and the second MDDT by using the MDDT corresponding to the UE, where the first MDDT indicates a maximum delay tolerance value corresponding to processing, by the UE, the downlink data of all the services on the UE; determine a first IS value and the second IS value by using the IS corresponding to the UE, where the first IS value is duration when the UE is in an idle state; and provide the first MDDT and the first IS value to the sending module 406. Correspondingly, the sending module 406 sends the first MDDT and the first IS value to the UE.

Further optionally, the first MDDT may be less than or equal to the MDDT corresponding to the UE, the second MDDT may be less than or equal to the MDDT corresponding to the UE, and the first MDDT is greater than or equal to the second MDDT.

When the first MDDT is greater than the second MDDT, the first IS value is less than the second IS value, and that a sum of the first MDDT and the first IS value equals a sum of the second MDDT and the second IS value is satisfied. In this way, status synchronization can be implemented between the core network entity and the UE; meanwhile, when the UE and the core network entity are in a sleep mode simultaneously and the UE enters an idle state prior to the core network entity, it is implemented that the core network entity may send downlink data right at the time when the UE enters the idle state and listens on a network, thereby achieving an objective of power saving.

Further optionally, the acquiring module 405 is further configured to acquire an MUDT corresponding to the UE that is sent by the UE, and provide the MUDT corresponding to the UE to the determining module 401. The determining module 401 determines an MUDT by using the MUDT corresponding to the UE, and provides the MUDT to the sending module 406, where the MUDT indicates a maximum delay tolerance value corresponding to processing, by the UE, uplink data of all the services on the UE. Correspondingly, the sending module 406 sends the MUDT to the UE.

Figure 6:
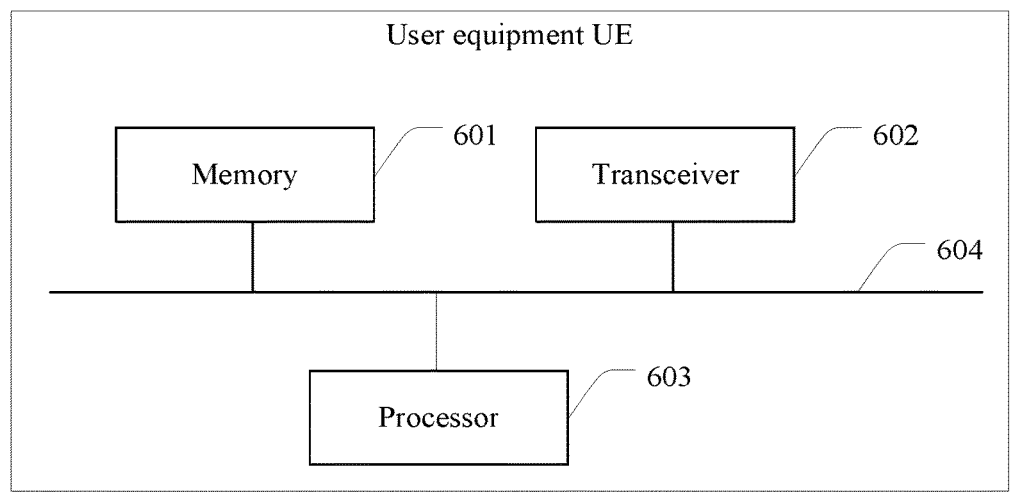
FIG. 6 is a structural diagram of hardware of a UE in a data processing system according to an embodiment of the present invention.

As shown in FIG. 6, FIG. 6 is a schematic diagram of a hardware structure of a UE. The UE may include a memory 601, a transceiver 602, a processor 603, and a bus 604, where the memory 601, the transceiver 602, and the processor 603 communicate and are connected by using the bus 604.

The memory 601 may be a read-only memory (ROM), a static storage device, a dynamic storage device, or a random access memory (RAM). The memory 601 may store an operating system and other application programs. When the technical solution provided by the embodiment of the present invention is implemented by using software or firmware, program code that is used to implement the technical solution provided by the embodiment of the present invention is stored in the memory 601, and is executed by the processor 603.

The transceiver 602 is configured for the apparatus to communicate with another device or a communications network (for example but not limited to an Ethernet network, a radio access network (RAN), and a wireless local area network (WLAN)).

The processor 603 may use a universal central processing unit (CPU), a microprocessor, an application-specific integrated circuit (ASIC), or one or more integrated circuits for executing a related program, so as to implement the technical solution provided by the embodiment of the present invention.

The bus 604 may include a path for transmitting information between components (for example, the memory 601, the transceiver 602, and the processor 603) of the apparatus.

It should be noted that, although the hardware shown in FIG. 6 merely shows the memory 601, the transceiver 602, the processor 603, and the bus 604, in a specific implementation process, a person skilled in the art should understand that the terminal further includes other devices necessarily required for implementing normal operation. Meanwhile, according to a specific requirement, a person skilled in the art should understand that a hardware device that implements another function may further be included.

Specifically, when the UE shown in FIG. 6 is used to implement the apparatus shown in the embodiments of FIG. 2 and FIG. 3, the transceiver 602 in the apparatus is configured to acquire a first MDDT sent by a core network entity, and provide the first MDDT to the processor 603, where the first MDDT indicates a maximum delay tolerance value corresponding to processing, by the apparatus, downlink data of all services on the apparatus.

The processor 603 is coupled with the memory 601 and the transceiver 602, configured to control execution of a program routine, and specifically configured to: determine time information of a first MDDT timer by using the first MDDT, where the time information of the first MDDT timer includes start time and end time of a UE status corresponding to the first MDDT; and change the UE status according to the time information of the first MDDT timer.

Further, the transceiver 602 is further configured to acquire a first IS value sent by the core network entity, and provide the first IS value to the processor 603, where the first IS value is duration when the apparatus is in an idle state.

The processor 603 is further configured to: determine time information of a first IST by using the first IS value, where the time information of the first IST includes start time and end time of a UE status corresponding to the first IS value; and change the UE status according to the time information of the first IST.

The UE status includes a first active state, a first idle state, and a first SLM state; the processor 603 is specifically configured to:

After the apparatus in the first active state completes data sending/receiving processing, start the first MDDT timer and change the first active state to the first SLM state at start time of the first MDDT timer, where the first active state is a state in which the apparatus sends/receives data, and the first SLM state is a state in which the apparatus stops listening on a network and forbids receiving downlink data; and start the first IST at end time of the first MDDT timer, and change the first SLM state to the first idle state at start time of the first IST, where the first idle state is a state in which the apparatus listens on the network in a discontinuous reception DRX manner.

Start the first MDDT timer at end time of the first IST, and change the first idle state to the first SLM state at the start time of the first MDDT timer.

When the apparatus is in the first idle state, and the apparatus initiates MO or the transceiver 602 initiates a network access signal, stop the first IST, change the first idle state to the first active state, and process initiation of the MO or process an operation of accessing the network. Correspondingly, the transceiver 602 acquires the mobile originated MO or receives a downlink paging signal, initiates the network access signal, and informs the processor 603 that the MO is acquired or the network access signal is initiated, where the MO includes MO data and MO signaling.

When the apparatus is in the first SLM state and the apparatus initiates the MO, process initiation of the MO according to a preset manner. Correspondingly, when the apparatus is in the first SLM state, and the apparatus initiates the MO, the transceiver 602 executes initiation of the MO according to a preset manner.

When the apparatus is in the first SLM state, and when the apparatus initiates the MO data, the processor 603 stops the first MDDT timer; when the apparatus needs to send the MO signaling, the processor 603 stops the first MDDT timer, changes the first SLM state to the first active state, and processes initiation of the MO data; and when the processor 603 changes the first SLM state to the first active state, the transceiver 602 executes initiation of the MO data.

When the apparatus is in the first SLM state and when the apparatus initiates the MO data, the transceiver 602 acquires an MUDT corresponding to the MO data, and provides the MUDT corresponding to the MO data to the processor 603. Then the processor 603 compares the MUDT with remaining time that is set for the first MDDT timer, and when the MUDT is less than the remaining time that is set for the first MDDT timer, stops the first MDDT timer, changes the first SLM state to the first active state, and provides, to the transceiver 602, a message carrying that the first SLM state is changed to the first active state.

When the MUDT is greater than or equal to the remaining time that is set for the first MDDT timer, the processor 603 waits until time that is set by the first MDDT timer expires, changes the first SLM state to the first active state, and provides, to the transceiver 602, a message carrying that the first SLM state is changed to the first active state.

When the processor 603 changes the first SLM state to the first active state, the transceiver 602 executes initiation of the MO data.

Further optionally, the transceiver 602 is further configured to acquire a maximum uplink delay tolerance MUDT sent by the core network entity, where the MUDT indicates a maximum delay tolerance value corresponding to processing, by the apparatus, uplink data of all the services on the apparatus.

Further optionally, the transceiver 602 is further configured to: send, to the core network entity, an MDDT corresponding to the apparatus or an MDDT corresponding to each service on the apparatus, where both the MDDT corresponding to the apparatus and the MDDT corresponding to each service on the apparatus are bases for obtaining the first MDDT; send, to the core network entity, an IS value corresponding to the apparatus, where the IS value corresponding to the apparatus is a basis for obtaining the first IS value.

It should be noted that the first MDDT may be less than or equal to the MDDT corresponding to the apparatus, a second MDDT may be less than or equal to the MDDT corresponding to the apparatus, and the first MDDT is greater than or equal to the second MDDT, where the second MDDT indicates a maximum delay tolerance value corresponding to processing, by the core network entity, the downlink data of all the services on the apparatus.

When the first MDDT is greater than the second MDDT, the first IS value is less than a second IS value, and that a sum of the first MDDT and the first IS value equals a sum of the second MDDT and the second IS value is satisfied, where the second IS value is duration when the core network entity is in an idle state when processing all the services on the apparatus.

Further optionally, the first SLM state may further be a state in which the apparatus stops listening on the network and forbids sending uplink data and receiving downlink data.

In the prior art, the following method is used to perform power saving on a UE: states in which a UE corresponding to a delay-insensitive service is connected to a network are classified into an active state and an idle state, and in the idle state, the UE listens on a network according to a constant PO period. However, when there is a significant difference between an interval at which the UE receives downlink data and an interval of the PO period, a problem of unnecessary power consumption of the UE arises. In comparison with this method in the prior art, the data processing apparatus provided by the embodiment of the present invention may use a maximum downlink delay tolerance corresponding to each service on a UE to minimize time during which the UE is in an idle state, thereby reducing power consumption of the UE.

As shown in FIG. 7, FIG. 7 is a schematic diagram of a hardware structure of a core network entity. The core network entity may include a memory 701, a transceiver 702, a processor 703, and a bus 704. The memory 701, the transceiver 702, and the processor 703 communicate and are connected by using the bus 704.

In the apparatus, for description of a common function of the memory 701, the transceiver 702, the processor 703, and the bus 704, reference may be made to descriptions of the memory 701, the transceiver 702, the processor 703, and the bus 704 included in the UE shown in FIG. 6, which is not further described herein.

It should be noted that, although the hardware shown in FIG. 7 merely shows the memory 701, the transceiver 702, the processor 703, and the bus 704, in a specific implementation process, a person skilled in the art should understand that the terminal further includes other devices necessarily required for implementing normal operation. Meanwhile, according to a specific requirement, a person skilled in the art should understand that a hardware device that implements another function may further be included.

Specifically, when the core network entity shown in FIG. 7 is used to implement the apparatus shown in the embodiments of FIG. 4 and FIG. 5, the processor 703 in the apparatus is coupled with the memory 701 and the transceiver 702, configured to control execution of a program routine, and specifically configured to: determine a second MDDT, where the second MDDT indicates a maximum delay tolerance value corresponding to processing, by the apparatus, downlink data of all services on a user equipment UE, and the UE is any user equipment managed by the apparatus; determine time information of a second MDDT timer by using the second MDDT, where the time information of the second MDDT timer includes start time and end time of a core network entity status corresponding to the second MDDT; and change the core network entity status according to the time information of the second MDDT timer.

Further, the processor 703 is further configured to: determine a second IS value, where the second IS value is duration when the apparatus is in an idle state when processing all the services on the UE; determine time information of a second idle state timer IST by using the second IS value, where the time information of the second IST includes start time and end time of a core network entity status corresponding to the second IS value; and change the core network entity status according to the time information of the second IST timer.

The core network entity status includes a second active state, a second idle state, and a second SLM state.

After the apparatus in the second active state completes sending/receiving processing on data of the UE, the processor 703 starts the second MDDT timer and changes the second active state to the second SLM state at start time of the second MDDT timer, where the second active state is a state in which the apparatus sends/receives the data of the UE, and the second SLM state is a state in which sending downlink data of the UE is forbidden.

The processor 703 starts the second IST at end time of the second MDDT timer, and changes the second SLM state to the second idle state at start time of the second IST, where the second idle state is a state in which the apparatus sends paging information to the UE in a discontinuous reception DRX manner.

The processor 703 starts the second MDDT timer at end time of the second IST, and changes the second idle state to the second SLM state at the start time of the second MDDT timer.

When the apparatus is in the second idle state and when the transceiver 702 receives signaling that triggers receiving of mobile originated MO sent by the UE, the processor 703 stops the second IST, changes the second idle state to the second active state, and provides, to the transceiver 702, a message carrying that the second idle state is changed to the second active state. Correspondingly, when the second idle state is changed to the second active state, the transceiver 702 receives the MO.

When the apparatus is in the second SLM state and when the transceiver 702 receives signaling that triggers receiving of MO sent by the UE, the processor 703 stops the second MDDT, changes the second SLM state to the second active state, and provides, to the transceiver 702, a message carrying that the second SLM state is changed to the second active state. Correspondingly, when the second SLM state is changed to the second active state, the transceiver 702 receives the MO.

Further optionally, the transceiver 702 is configured to: receive an MDDT corresponding to the UE that is sent by the UE; or receive an MDDT corresponding to each service on the UE that is sent by the UE, and provide the MDDT corresponding to each service on the UE to the processor 703; receive an IS value corresponding to the UE that is sent by the UE; or acquire, from a home subscriber server HSS, an MDDT corresponding to the UE or an IS value corresponding to the UE. Then the processor 703 determines the MDDT corresponding to the UE by using the MDDT corresponding to each service on the UE, and sets the IS value corresponding to the UE.

In addition, the processor 703 is further configured to: determine a first MDDT and the second MDDT by using the MDDT corresponding to the UE, where the first MDDT indicates a maximum delay tolerance value corresponding to processing, by the UE, the downlink data of all the services on the UE; determine a first IS value and the second IS value by using the IS corresponding to the UE, where the first IS value is duration when the UE is in an idle state; and provide the first MDDT and the first IS value to the transceiver 702. The transceiver 702 sends the first MDDT and the first IS value to the UE.

It should be noted that the first MDDT may be less than or equal to the MDDT corresponding to the UE, the second MDDT may be less than or equal to the MDDT corresponding to the UE, and the first MDDT is greater than or equal to the second MDDT.

When the first MDDT is greater than the second MDDT, the first IS value is less than the second IS value, and that a sum of the first MDDT and the first IS value equals a sum of the second MDDT and the second IS value is satisfied.

Further optionally, the transceiver 702 is further configured to acquire an MUDT corresponding to the UE that is sent by the UE, and provide the MUDT corresponding to the UE to the processor 703. The processor 703 determines an MUDT by using the MUDT corresponding to the UE, and provides the MUDT to the transceiver 702, where the MUDT indicates a maximum delay tolerance value corresponding to processing, by the UE, uplink data of all the services on the UE. Then the transceiver 702 sends the MUDT to the UE.

Figure 8B:
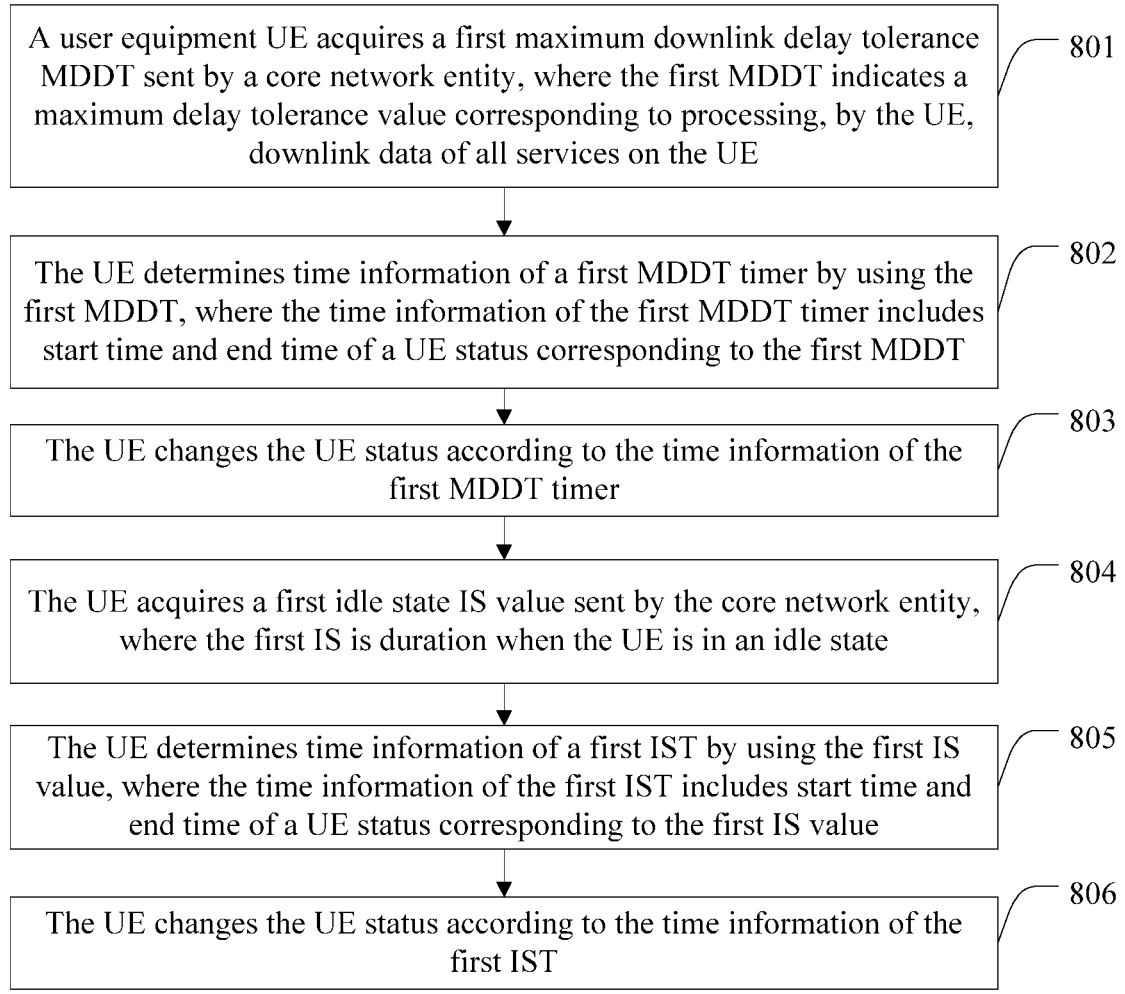
FIG. 8(b) is a flowchart of another data processing method according to an embodiment of the present invention.

With reference to FIG. 2 and FIG. 3, the present invention provides a data processing method. As shown in FIG. 8(*a*), the method includes:

801. A UE acquires a first MDDT sent by a core network entity, where the first MDDT indicates a maximum delay tolerance value corresponding to processing, by the UE, downlink data of all services on the UE.

802. The UE determines time information of a first MDDT timer by using the first MDDT, where the time information of the first MDDT timer includes start time and end time of a UE status corresponding to the first MDDT.

Time is set for the first MDDT timer by using the first MDDT. For example, if the first MDDT is 10 min, the time that is set for the first MDDT timer is 10 min. The first MDDT timer is used to determine duration (a period of time) when the UE is in a first SLM state.

803. The UE changes the UE status according to the time information of the first MDDT timer.

The present invention may use a maximum downlink delay tolerance corresponding to each service on a UE to minimize time during which the UE is in an idle state, thereby reducing power consumption of the UE.

Further optionally, based on FIG. 8(*a*), the present invention provides another data processing method. As shown in FIG. 8(*b*), the method further includes:

804. The UE acquires a first IS value sent by the core network entity, where the first IS value is duration when the UE is in an idle state.

805. The UE determines time information of a first IST by using the first IS value, where the time information of the first IST includes start time and end time of a UE status corresponding to the first IS value.

Time is set for the first IST by using the first IS value. The first IST is used to determine duration (a period of time) when the UE is in a first idle state.

806. The UE changes the UE status according to the time information of the first IST.

It should be noted that the UE status may include a first active state, the first idle state, and the first SLM state.

Further optionally, there are two manners for the UE to acquire the first MDDT and the first IS value that are sent by the core network entity, which specifically include:

A first manner: The UE acquires the first MDDT and the first IS value by using a UE-specific message that carries the first MDDT and the first IS value and is sent by the core network entity.

A second manner: The UE correspondingly finds the first MDDT and the first IS value belonging to a type of the UE by using a system broadcast message sent by the core network entity.

Further optionally, before step 801, the UE sends, to the core network entity, an MDDT corresponding to the UE or an MDDT corresponding to each service on the UE, where both the MDDT corresponding to the UE and the MDDT corresponding to each service on the UE are bases for obtaining the first MDDT; the UE sends, to the core network entity, an IS value corresponding to the UE, where the IS value corresponding to the UE is a basis for obtaining the first IS value.

The MDDT corresponding to the UE is a smallest maximum downlink delay tolerance among maximum downlink delay tolerances corresponding to all the services on the UE. For example, if there are two services (Service1 and Service2) on the UE, a maximum downlink delay tolerance corresponding to Service1 is 20 min, and a maximum downlink delay tolerance corresponding to Service2 is 30 min, then the MDDT corresponding to the UE is 20 min. In addition, the IS value corresponding to the UE may be set by the core network entity uniformly. The corresponding IS value may be determined by a type of the UE, or the IS value corresponding to the UE may be set in advance. When the IS value corresponding to the UE is set by the core network entity uniformly, the UE does not need to send the IS value corresponding to the UE to the core network entity.

Further optionally, in step 803, that the UE changes the UE status according to the time information of the first MDDT timer or changes the UE status according to the time information of the first IST specifically includes:

After the UE in the first active state completes data sending/receiving processing, the UE starts the first MDDT timer and changes the first active state to the first SLM state at start time of the first MDDT timer, where the first active state is a state in which the UE sends/receives data, and the first SLM state is a state in which the UE stops listening on a network and forbids receiving downlink data.

The UE starts the first IST at end time of the first MDDT timer, and changes the first SLM state to the first idle state at start time of the first IST, where the first idle state is a state in which the UE listens on the network in a discontinuous reception DRX manner.

The UE starts the first MDDT timer at end time of the first IST, and changes the first idle state to the first SLM state at the start time of the first MDDT timer.

It should be noted herein that, when the UE changes the first SLM state to the first idle state, the end time of the first MDDT is the start time of the first IST; when the UE changes the first idle state to the first SLM state, the end time of the first IST is the start time of the first MDDT.

Further optionally, this solution may further include:

The UE acquires a maximum uplink delay tolerance (MUDT) sent by the core network entity, where the MUDT indicates a maximum delay tolerance value corresponding to processing, by the UE, uplink data of all the services on the UE; and the UE determines time of an MUDT timer by using the MUDT.

The MUDT corresponding to the UE is a smallest maximum uplink delay tolerance among maximum uplink delay tolerances corresponding to all the services on the UE. For example, if there are two uplink services (Service3 and Service4) on the UE, a maximum uplink delay tolerance corresponding to Service3 is 10 min, and a maximum uplink delay tolerance corresponding to Service4 is 15 min, then the MUDT corresponding to the UE is 10 min. It should be noted that data corresponding to Service3 and Service4 described herein for example is mobile originated (MO) data. The MO data is a type of MO, and MO further includes MO signaling. The MO data may be uplink data corresponding to all the services on the UE. The MO signaling may be a mobility management (MM) process, for example, a tracking area update (TAU) process.

In addition, it should be noted that a manner in which the UE acquires the MUDT is the same as a manner in which the UE acquires the first MDDT and the first IS value, which is not further described herein.

Further optionally, step 803 may further include:

When the UE is in the first idle state, and the UE initiates MO or the UE receives a downlink paging signal and initiates a network access signal, the UE stops the first IST, changes the first idle state to the first active state, and executes initiation of the MO or performs an operation of accessing the network.

It may be understood that the MO is one type of uplink data that the UE initiates. When the UE is in the first idle state, the UE may immediately change the first idle state to the first active state, send the MO, and check whether there is delivering of downlink data, and if there is downlink data, the UE receives delivered downlink data while sending the MO.

Further optionally, step 803 may further include:

When the UE is in the first SLM state, and the UE initiates the MO, the UE executes initiation of the MO according to a preset manner.

The MO includes the MO data and the MO signaling, correspondingly, the MO data has a corresponding MUDT, and an MUDT of the MO signaling is 0. Therefore, when the UE is in the first SLM state and when the UE sends the MO signaling, the UE stops the first MDDT, changes the first SLM state to the first active state, and executes initiation of the MO signaling.

When the UE initiates the MO data, there are two manners for the UE to send the MO data, which are as follows:

A first manner: The UE stops the first MDDT timer, changes the first SLM state to the first active state, and executes initiation of the MO data.

In the first manner, the UE does not consider the MUDT corresponding to the MO data, directly stops the first MDDT timer, immediately changes the first SLM state to the first active state, then sends the MO data, and checks whether there is delivering of downlink data, and if there is downlink data, the UE receives delivered downlink data while sending the MO data.

A second manner: When the UE initiates the MO data, the UE acquires the MUDT corresponding to the MO data and compares the MUDT with remaining time that is set for the first MDDT timer; when the MUDT is less than the remaining time that is set for the first MDDT timer, the UE stops the first MDDT timer, changes the first SLM state to the first active state, and executes initiation of the MO data; when the MUDT is greater than or equal to the remaining time that is set for the first MDDT timer, the UE waits until time that is set for the first MDDT timer expires, and the UE changes the first SLM state to the first active state after the time that is set for the first MDDT timer expires (that is, the UE changes the first SLM state to the first active state at the end time of the first MDDT timer), and executes initiation of the MO data. For example, when the UE is in the first SLM state, first MO data needs to be sent, and an MUDT corresponding to the first MO data is 10 min. If the UE finds that the remaining time that is set for the first MDDT timer is 5 min, the UE waits until the time that is set for the first MDDT timer expires, changes the first SLM state to the first active state, then executes initiation of the MO data, and checks whether there is delivering of downlink data, and if there is downlink data, the UE receives delivered downlink data while sending the first MO data. If the UE finds that the remaining time that is set for the first MDDT timer is 15 min, the UE immediately changes the first SLM state to the first active state, executes sending of the first MO data, and optionally, receives delivered downlink data.

It should be further noted that specific ranges of the first MDDT and the first IS value are not limited in this embodiment. Units of the first MDDT and the first IS value may be ms, s, min, h, d, or the like.

It should be further noted that, in the prior art, a detach state and an attach state are also used to perform a power-saving operation for a UE. The UE is generally in the attach state (which is equivalent to the active state in the present invention), and the detach state is a UE shutdown state (stopping listening on a network and forbidding sending uplink data and receiving downlink data). When the UE needs to change from the detach state to the attach state, a changing operation needs to be performed manually. Correspondingly, in the present invention, the UE has the first active state (which is equivalent to the attach state in the prior art) and the first SLM state (it should be noted that the first SLM state herein is a state in which listening on a network is stopped and sending uplink data and receiving downlink data are forbidden). After the UE in the first active state completes sending uplink data/receiving downlink data, the UE starts the first MDDT timer, and then the UE changes from the first active state to the first SLM state. After the time that is set for the first MDDT timer expires, the UE starts the first IST and changes from the first active state to the first idle state (generally, in this type of UE, a range of the first IS value is relatively small, that is, time during which the UE is in the first idle state is relatively short). When the UE is in the first idle state and detects that there is delivering of downlink data or there is no sending of uplink data, the UE changes from the first idle state to the first active state, and executes uplink data sending/downlink data receiving. When the UE is in the first idle state and detects that there is no delivering of downlink data or sending of uplink data, after the time that is set for the first IST expires, the UE starts the first MDDT timer and changes from the first idle state to the first SLM state. It should be noted that, in the embodiment, the UE is generally a device at a relatively fixed position (for example, a water meter), and uplink data sent by the UE is MO data; when the UE needs to send the uplink data (MO data) in the SLM state, the UE may wait until the UE is in the first idle state or the first active state and then sends the uplink data (MO data).

In addition, in the embodiment, the first IS value may be set to 0, which means that the UE does not have the first idle state. When the time that is set for the first MDDT timer expires, the UE changes from the first SLM state to the first active state, and then the UE in the first active state detects whether there is uplink data sending/downlink data receiving; when the UE detects that there is no sending/receiving signaling of uplink/downlink data, the UE restarts the first MDDT timer and changes from the first active state to the first SLM state. Therefore, the present invention may reduce power consumption of the UE.

It should be further noted that, in the prior art, an active state and a DRX state of the active state are also used to perform a power-saving operation for a UE. The active state is the same as the first active state in the present invention, and the DRX state of the active state is a state in which downlink data is continuously received and sending uplink data is forbidden. Using the method in the prior art to perform a power-saving operation for the UE causes that the UE cannot send uplink data (MO data and MO signaling) in time in the DRX state of the active state. In the present invention, the first active state, the first idle state, and the first SLM state are used, so that the UE may receive downlink data within permitted time and send uplink data within permitted time, and the UE may be in a complete power-saving state (the first SLM state) when there is no data exchange, thereby effectively reducing power consumption of the UE without affecting a UE working state. In addition, in the embodiment, the first active state and the first idle state may be understood as an active synchronization state, and the first SLM state may be understood as an active out-of-synchronization state.

Figure 9A:
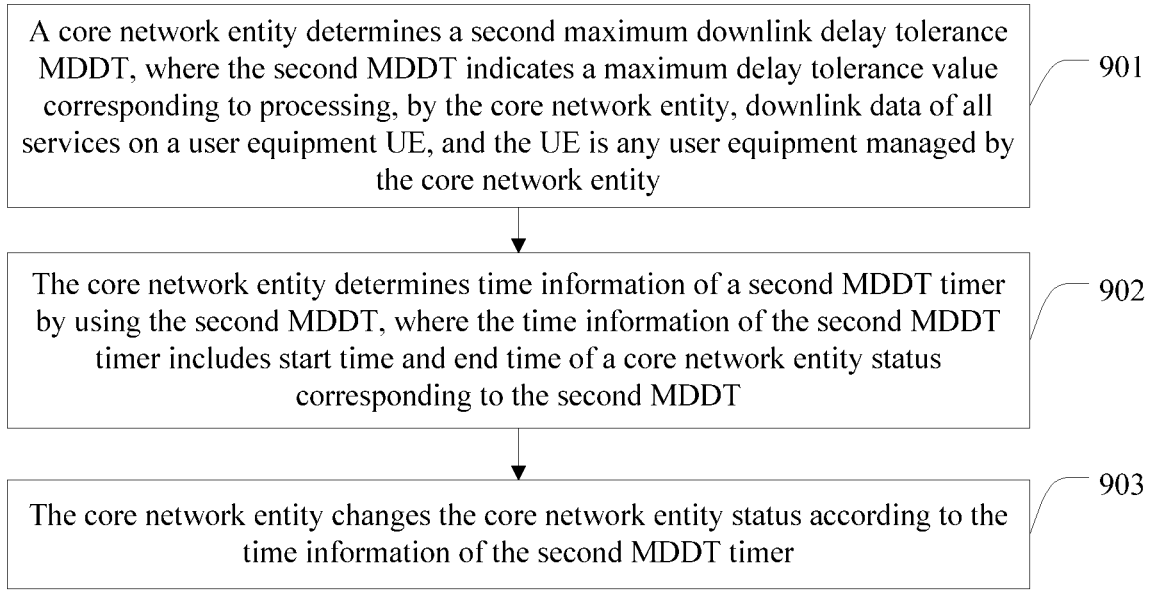
FIG. 9(a) is a flowchart of still another data processing method according to an embodiment of the present invention.
Figure 9B:
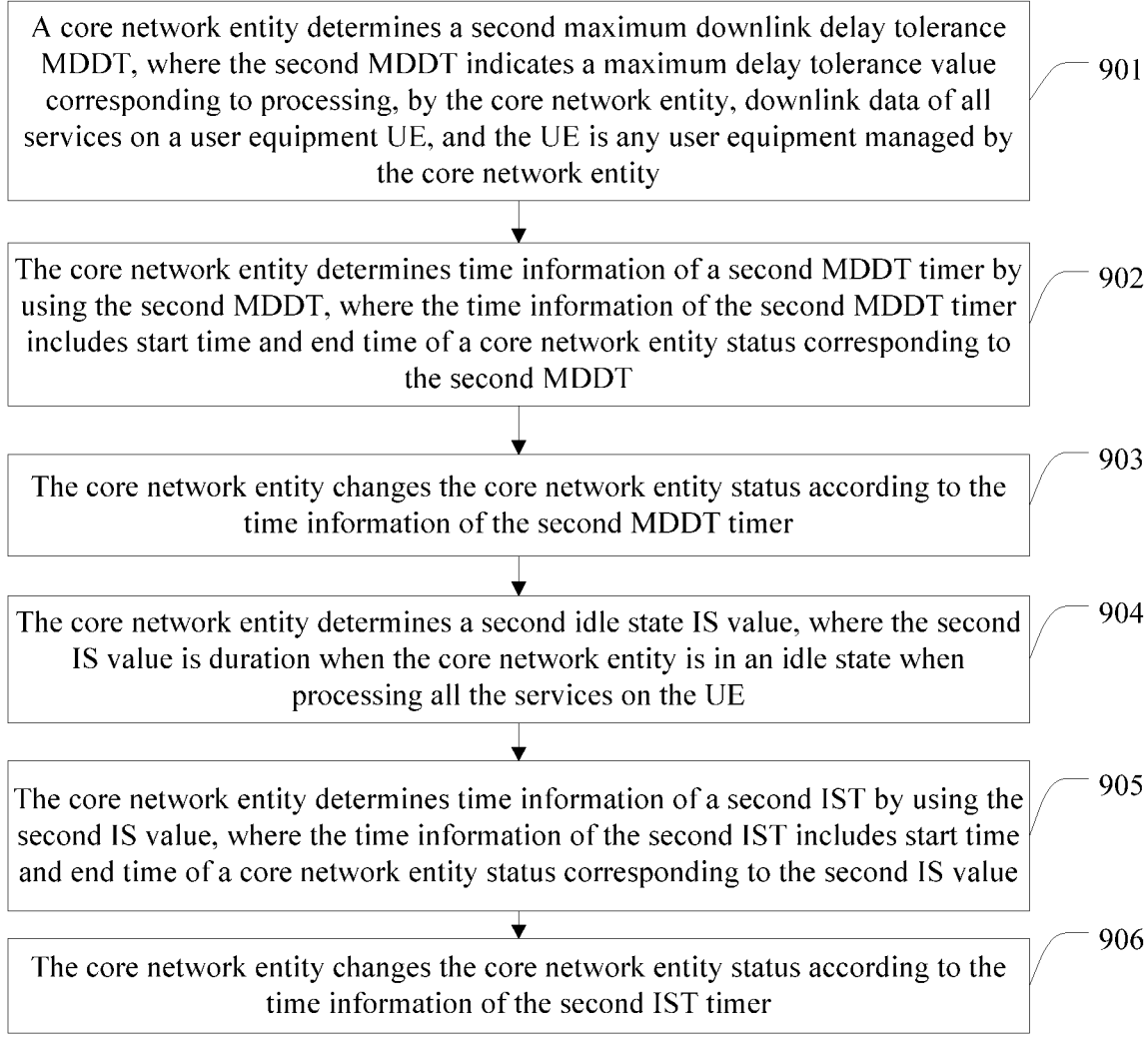
FIG. 9(b) is a flowchart of yet another data processing method according to an embodiment of the present invention.

With reference to FIG. 4 and FIG. 5, the present invention further provides a data processing method. As shown in FIG. 9(*a*), the method includes:

901. A core network entity determines a second MDDT, where the second MDDT indicates a maximum delay tolerance value corresponding to processing, by the core network entity, downlink data of all services on a UE, and the UE is any user equipment managed by the core network entity.

902. The core network entity determines time information of a second MDDT timer by using the second MDDT, where the time information of the second MDDT timer includes start time and end time of a core network entity status corresponding to the second MDDT.

Time is set for the second MDDT timer by using the second MDDT. For example, if the second MDDT is 9 min, the time that is set for the second MDDT timer is 9 min. The second MDDT timer is used to determine duration (a period of time) when the core network entity is in a second SLM state.

903. The core network entity changes the core network entity status according to the time information of the second MDDT timer.

The present invention may use a maximum downlink delay tolerance corresponding to each service on a UE to minimize time during which the UE is in an idle state, so that a core network entity cooperates with the UE for power saving, and when the UE is in a first SLM state (sleep mode), the core network entity performs an operation, such as paging, on the UE within specific time, which prevents the core network entity from determining that the UE is in an unreachable state or in an abnormal shutdown state because the core network entity cannot obtain a response from the UE within preset time. In this way, power consumption of the UE is reduced and an objective of saving network resources (reducing sending of signaling) is achieved at the same time.

Further, based on FIG. 9(*a*), the present invention further provides a data processing method. As shown in FIG. 9(*b*), the method further includes:

904. The core network entity determines a second IS value, where the second IS value is duration when the core network entity is in an idle state when processing all the services on the UE.

905. The core network entity determines time information of a second IST by using the second IS value, where the time information of the second IST includes start time and end time of a core network entity status corresponding to the second IS value.

Time is set for the second IST by using the second IS value. The second IST is used to determine duration (a period of time) when the core network entity is in a second idle state.

906. The core network entity changes the core network entity status according to the time information of the second IST timer.

It should be noted that the core network entity status may include a second active state, the second idle state, and the second sleep mode SLM state.

Further optionally, before step 901, the method further includes that: the core network entity acquires an MDDT corresponding to the UE and/or an IS value corresponding to the UE. An acquiring manner of the core network entity specifically includes:

Acquiring the MDDT corresponding to the UE: The core network entity receives the MDDT corresponding to the UE that is sent by the UE; or receives an MDDT corresponding to each service on the UE that is sent by the UE, and determines the MDDT corresponding to the UE by using the MDDT corresponding to each service on the UE; or acquires, from a home subscriber server (HSS), the MDDT corresponding to the UE.

Acquiring the IS value corresponding to the UE: The core network entity receives the IS value corresponding to the UE that is sent by the UE; or sets the IS value corresponding to the UE; or acquires, from an HSS, the IS value corresponding to the UE.

It may be understood that, when the IS value corresponding to the UE is set by the core network entity uniformly, the core network entity acquires the set IS value corresponding to the UE.

Further optionally, after the core network entity obtains the MDDT corresponding to the UE and the IS value corresponding to the UE, the method further includes:

The core network entity determines a first MDDT and the second MDDT by using the MDDT corresponding to the UE, determines a first IS value and the second IS value by using the IS value corresponding to the UE, and then sends the first MDDT and the first IS value to the UE.

There are two manners for the core network entity to send the first MDDT and the first IS value to the UE, which are specifically:

A first manner: The core network entity sends, to the UE, a UE-specific message carrying the first MDDT and the first IS value.

A second manner: The core network entity sends a system broadcast message, where the system broadcast message includes the first MDDT and the first IS value of the UE.

It should be further noted that the first MDDT may be less than or equal to the MDDT corresponding to the UE, the second MDDT may be less than or equal to the MDDT corresponding to the UE, and the first MDDT is greater than or equal to the second MDDT.

For example, if the MDDT corresponding to the UE is 30 min, the core network entity may set the first MDDT to 29.5 min and set the second MDDT to 29 min.

When the first MDDT is greater than the second MDDT, the first IS value is less than the second IS value, and that a sum of the first MDDT and the first IS value equals a sum of the second MDDT and the second IS value is satisfied.

According to the foregoing example, when the IS corresponding to the UE is 9 min, the core network entity may set the first IS value to 9 min and set the second IS value to 9.5 min. Preferably, by using this embodiment, it may be implemented that time during which the UE is in a first idle state is longer than time during which the core network entity is in the second idle state, which ensures that a success rate of receiving a paging message may be increased when the UE is in the first idle state. In addition, it may also be implemented that a sum of time of the first MDDT and time of the first IS value equals a sum of time of the second MDDT and time of the second IS value, which ensures synchronism of a network side and a UE side. It should be noted that, for different UEs, the core network entity has different second active states, second idle states, and second SLM states.

Further optionally, in step 903, that the core network entity changes the core network entity status according to the time information of the second MDDT timer or changes the core network entity status according to the time information of the second IST timer specifically includes:

After the core network entity in the second active state completes sending/receiving processing on data of the UE, the core network entity starts the second MDDT timer, changes the second active state to the second SLM state at start time of the second MDDT timer, where the second active state is a state in which the core network entity sends/receives the data of the UE, and the second SLM state is a state in which sending downlink data of the UE is forbidden.

The core network entity starts the second IST at end time of the second MDDT timer, and changes the second SLM state to the second idle state at start time of the second IST, where the second idle state is a state in which the core network entity sends paging information to the UE in a discontinuous reception DRX manner.

The core network entity starts the second MDDT timer at end time of the second IST, and changes the second idle state to the second SLM state at the start time of the second MDDT timer.

It should be noted herein that, when the core network entity changes the second SLM state to the second idle state, the end time of the second MDDT is the start time of the second IST; when the core network entity changes the second idle state to the second SLM state, the end time of the second IST is the start time of the second MDDT.

When the core network entity is in the second idle state, and when the core network entity receives mobile originated MO sent by the UE, the core network entity stops the second IST, changes the second idle state to the second active state, and receives the MO.

When the core network entity is in the second SLM state, and when the core network entity receives mobile originated MO sent by the UE, the core network entity stops the second MDDT timer, changes the second SLM state to the second active state, and receives the MO.

Further optionally, this solution may further include:

The core network entity acquires an MUDT corresponding to the UE that is sent by the UE. The core network entity determines an MUDT by using the MUDT corresponding to the UE, where the MUDT indicates a maximum delay tolerance value corresponding to processing, by the UE, uplink data of all the services on the UE. The core network entity sends the MUDT to the UE.

It may be understood that a manner in which the core network entity acquires the MUDT corresponding to the UE is the same as a manner in which the core network entity acquires the MDDT corresponding to the UE or the IS corresponding to the UE, and a manner in which the core network entity sends the MUDT to the UE is the same as a manner in which the core network entity sends the first MDDT and the first IS value to the UE, which are not further described herein.

Figure 10:
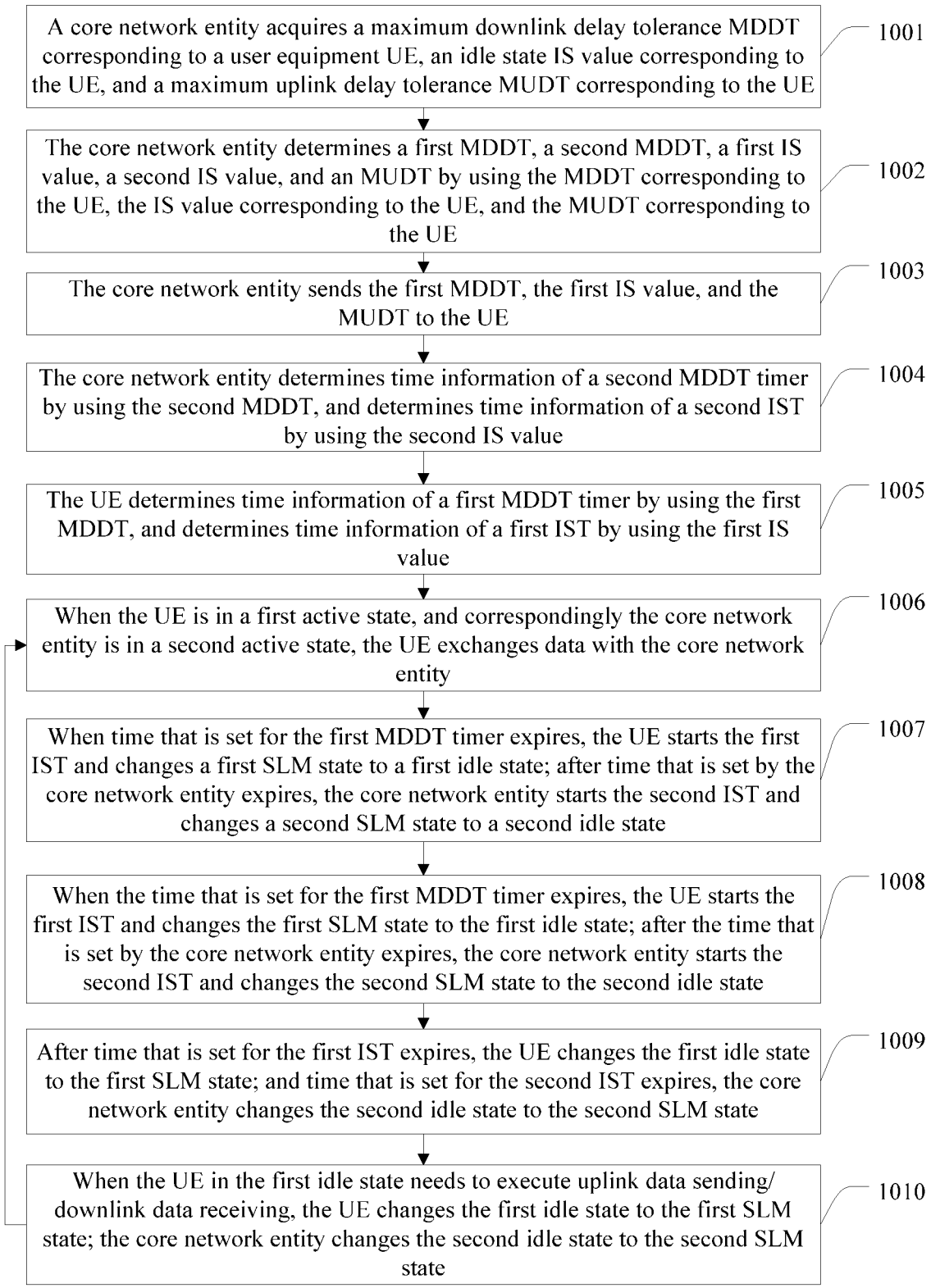
FIG. 10 is a flowchart of still yet another data processing method according to an embodiment of the present invention.

With reference to FIG. 8(a), FIG. 8(b), FIG. 9(a), and FIG. 9(b), the present invention further provides another data processing method. As shown in FIG. 10, the method specifically includes:

1001. A core network entity acquires an MDDT corresponding to a UE, an IS value corresponding to the UE, and an MUDT corresponding to the UE.

In the embodiment, the UE is any user equipment managed by the core network entity.

1002. The core network entity determines a first MDDT, a second MDDT, a first IS value, a second IS value, and an MUDT by using the MDDT corresponding to the UE, the IS value corresponding to the UE, and the MUDT corresponding to the UE.

Optionally, the first MDDT may be less than or equal to the MDDT corresponding to the UE, the second MDDT may be less than or equal to the MDDT corresponding to the UE, and the first MDDT is greater than or equal to the second MDDT. When the first MDDT is greater than the second MDDT, the first IS value is less than the second IS value, and that a sum of the first MDDT and the first IS value equals a sum of the second MDDT and the second IS value is satisfied.

It may be understood that, when the core network entity determines specific time values of the first MDDT, the second MDDT, the first IS value, and the second IS value, synchronism of a network side and a UE side needs to be ensured.

1003. The core network entity sends the first MDDT, the first IS value, and the MUDT to the UE.

The present invention does not limit whether the core network entity sends the first MDDT, the first IS value, and the MUDT to the UE simultaneously. That is, the first MDDT and the first IS value may be sent to the UE first, and then the MUDT is sent to the UE; or the MUDT may be sent to the UE first, and then the first MDDT and the first IS value are sent to the UE.

1004. The core network entity determines time information of a second MDDT timer by using the second MDDT, and determines time information of a second IST by using the second IS value.

Optionally, when the second IS value is equal to 0, the core network entity does not set the second IST.

1005. The UE determines time information of a first MDDT timer by using the first MDDT, and determines time information of a first IST by using the first IS value.

Optionally, when the first IS value is equal to 0, the UE does not set the first IST.

It should be noted that a sequence of step 1004 and step 1005 is not limited in the embodiment. For ease of description, that step 1004 and step 1005 are simultaneously performed is used as an example for description.

1006. When the UE is in a first active state, and correspondingly the core network entity is in a second active state, the UE exchanges data with the core network entity.

It should be noted that, for different UEs, the core network entity has different second active states, second idle states, and second SLM states correspondingly.

1007. After the UE completes data exchange with the core network entity, the UE starts the first MDDT timer and changes the first active state to a first SLM state; the core network entity starts the second MDDT timer and changes the second active state to a second SLM state.

When the UE is in the first SLM state, the UE cannot listen on a network or measure cell information. Optionally, when the UE is in the first SLM state, the UE may send MO. Certainly, whether the UE immediately sends the MO may be determined according to such information as a type of the MO and a result of comparison between the MUDT and remaining time that is set for the first MDDT timer.

When the core network entity is in the second SLM state, the core network entity forbids sending downlink data (for example, a paging message, signaling that triggers the UE to receive downlink data, or downlink data) to the UE.

1008. After time that is set for the first MDDT timer expires, the UE starts the first IST and changes the first SLM state to a first idle state; after time that is set for the core network entity expires, the core network entity starts the second IST and changes the second SLM state to a second idle state.

It may be understood that end time of the first MDDT is the same as start time of the first IST, and end time of the second MDDT is the same as start time of the second IST.

Optionally, when the first MDDT is less than the second MDDT, it indicates that the UE enters an idle state prior to the core network entity, thereby ensuring that the UE may increase a success rate of receiving a message, such as a paging message, that is sent by the core network entity.

Optionally, when the UE is in the first idle state, the UE may listen on the network, measure cell information, and receive a delivered message such as a paging message and signaling that triggers the UE to receive downlink data. When the core network entity is in the second idle state, the core network entity may send a message, such as a paging message and signaling that triggers the UE to receive downlink data, to the UE. Certainly, when the UE is in the first idle state, the UE may directly send MO to the core network entity.

When the UE in the first idle state has no uplink data to send and no downlink data to receive, after time that is set for the first IST expires, continue executing step 1009; when the UE in the first idle state has uplink data to send or downlink data to receive, continue executing step 1010.

1009. After time that is set for the first IST expires, the UE changes the first idle state to the first SLM state; after time that is set for the second IST expires, the core network entity changes the second idle state to the second SLM state.

It may be seen that, in this step, end time of the first IST is the same as start time of the first MDDT, and end time of the second IST is the same as start time of the second MDDT.

1010. When the UE in the first idle state needs to execute uplink data sending/downlink data receiving, the UE changes the first idle state to the first SLM state; the core network entity changes the second idle state to the second SLM state.

It may be understood that uplink data sending/downlink data receiving executed by the UE is in an and/or relationship, that is, the UE receives downlink data and/or sends uplink data.

After step 1010, the UE and the core network entity cyclically execute steps 1006 to 1009 according to a condition of uplink data sending/downlink data receiving.

Figure 11:
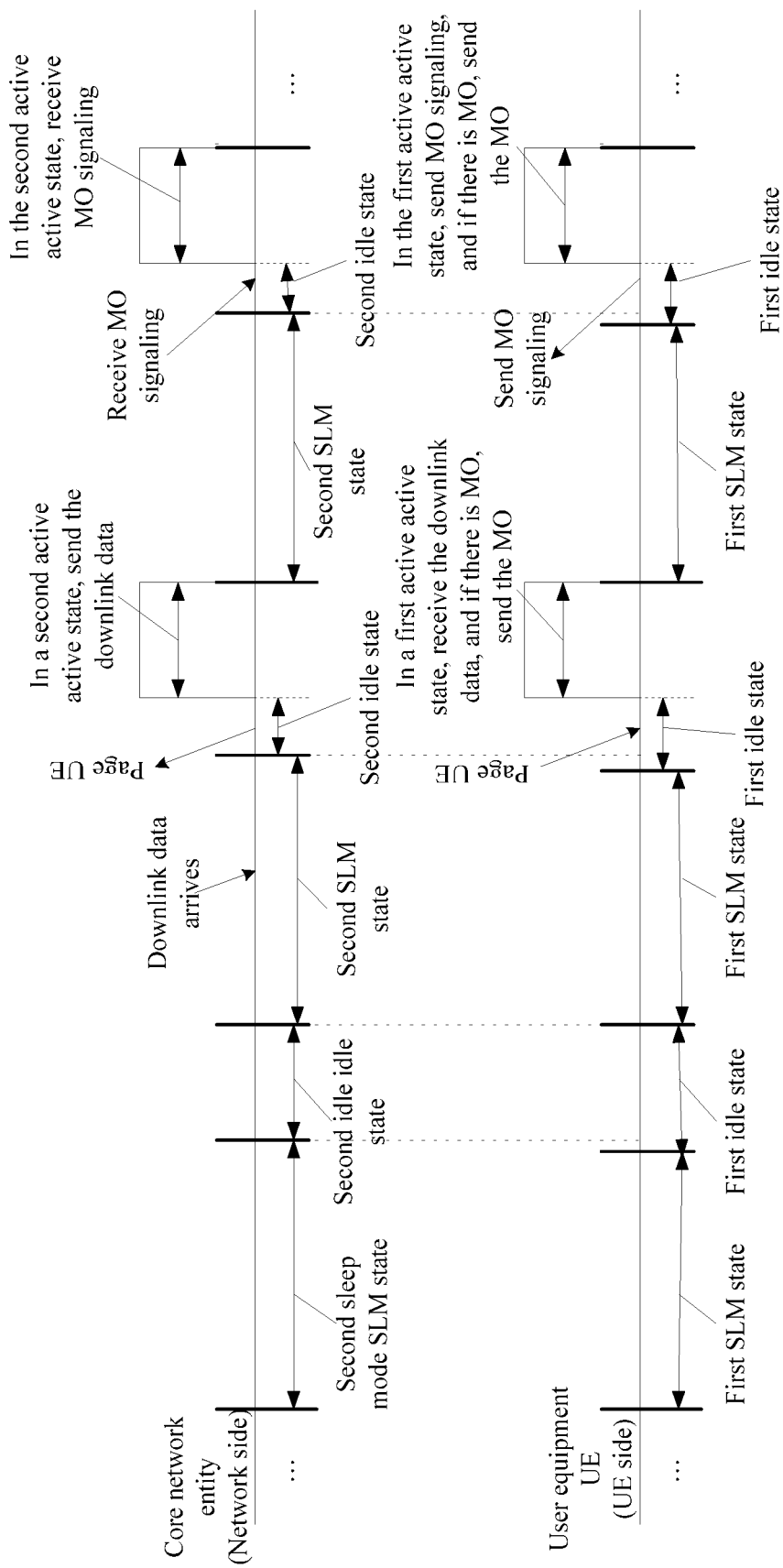
FIG. 11 is a schematic diagram of a synchronous status in which a UE and a core network entity are in all states in a data processing method according to an embodiment of the present invention.

It is further noted that, in order to clearly describe that the UE and the core network entity are in a synchronous status of all the states, reference may be made to FIG. 11. In FIG. 11, that the first MDDT is less than the second MDDT, and the first IS value is greater than the second IS value is used as an example for description. It may be seen that FIG. 11 shows that both the core network entity and the UE experience SLM states three times, idle states three times, and active states twice.

When the core network entity is in the second SLM state for the second time, downlink data arrives, the core network entity waits until time that is set for the second MDDT timer expires, starts the second IST, changes the second SLM state to the second idle state, and then sends a paging message to the UE; at this moment, the UE is in the first idle state, and after receiving the paging message sent by the core network entity, the UE feeds back a paging response; and then both the UE and the core network entity enter active states (the first active state and the second active state), and then the UE and the core network entity perform data exchange.

When the UE is in the first idle state for the third time and when cell information is measured, the UE finds that the cell information changes; at this moment, the UE initiates signaling of a TAU process to the core network entity, and when obtaining a response to the TAU process from the core network entity, the UE stops the first IST and changes the first idle state to the first active state; meanwhile, after the core network entity receives the signaling that is of initiating the TAU process and is sent by the UE, and feeds back the response to the TAU process to the UE, the core network entity stops the second IST and changes the second idle state to the second active state. When both the UE and the core network entity are in an active state, data (uplink data or downlink data) exchange is performed.

Figure 12:
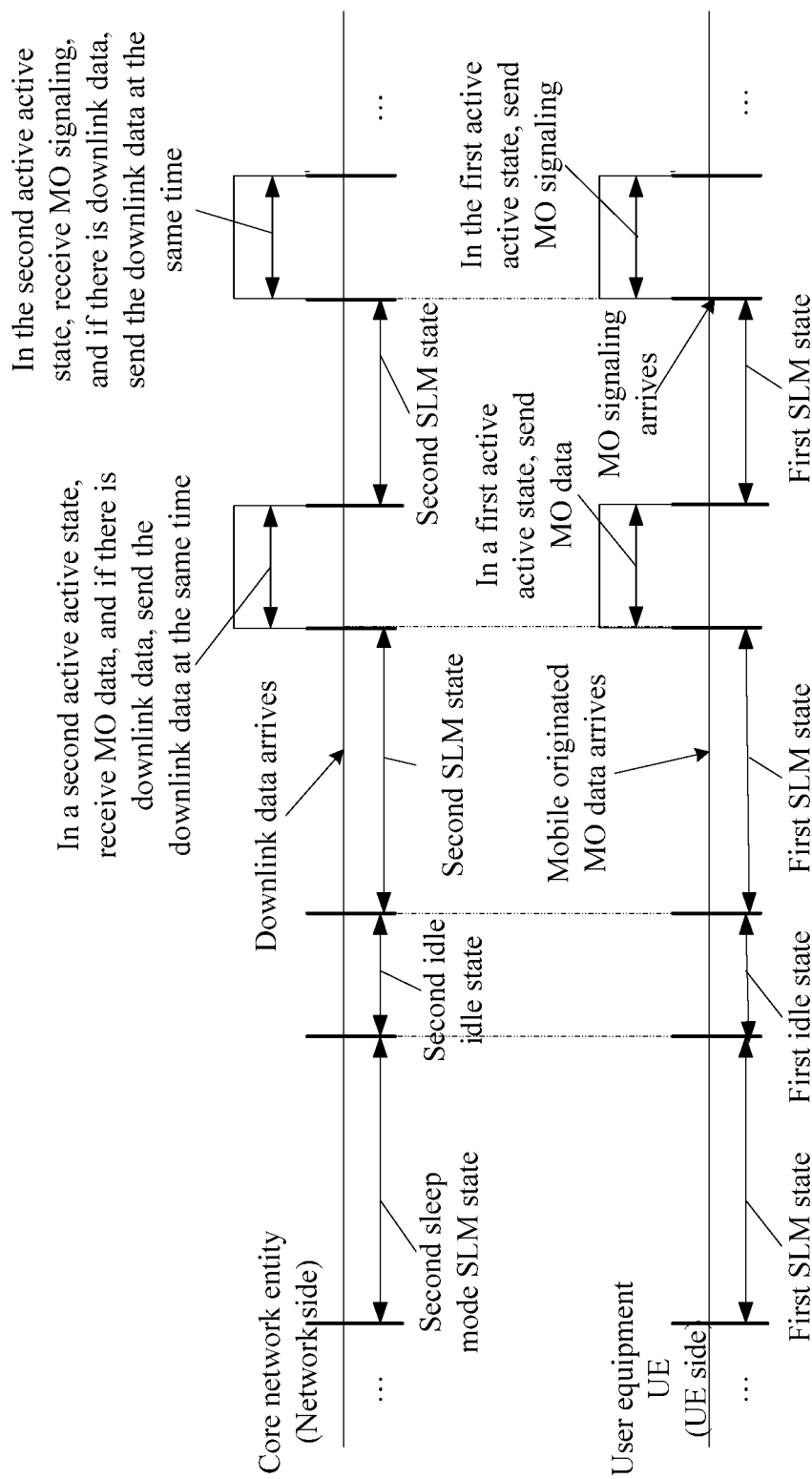
FIG. 12 is a schematic diagram of another synchronous status in which a UE and a core network entity are in all states in a data processing method according to an embodiment of the present invention.

It should be further noted that, in order to clearly describe that the UE and the core network entity are in a synchronous status of all the states, reference may be made to FIG. 12. In FIG. 12, that the first MDDT is equal to the second MDDT, and the first IS value is equal to the second IS value is used as an example for description. It may be seen that FIG. 13 shows that both the core network entity and the UE experience SLM states three times, idle states once, and active states twice.

When the UE is in the first SLM state for the second time, the UE needs to send MO data. Optionally, in the embodiment, an MUDT corresponding to the MO data is greater than or equal to the remaining time that is set for the first MDDT timer. Therefore, after waiting until the time that is set for the first MDDT timer expires, the UE changes the first SLM state to the first active state. Correspondingly, after triggering signaling of receiving the MO data, the core network entity changes the second SLM state to the second active state. (It should be noted that, in the embodiment, it is considered by default that network connection does not need to be performed when the UE and the core network entity change an SLM state to an active state. When the UE changes the first SLM state to the first active state and needs to perform network connection, both the UE and the core network entity need to perform transition from an SLM state to an idle state, and then to an active state.)

When the UE is in the first SLM state for the third time, and when a periodic tracking area update timer (PTAUT) of the UE expires, the UE needs to send signaling of a TAU process to the core network entity, to determine that the core network entity can learn position information of the UE all the time. An MUDT of the signaling of the TAU process (MO signaling) is equal to 0, which indicates that the UE needs to change the first SLM state to the first active state immediately, so as to send the signaling of the TAU process to the core network entity. Therefore, it may be seen from FIG. 12 that, in the first SLM state for the third time, the UE stops the first MDDT timer when the time that is set for the first MDDT timer does not expire, and changes the first SLM state to the first active state immediately. Correspondingly, on a network side, after a PTAUT corresponding to the UE in the core network entity expires, the core network entity stops the second MDDT timer and changes the second SLM state to the second active state.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing apparatus comprising:
a transmitter and receiver for sending and receiving data, respectively, while the apparatus is in an active state in which the apparatus sends/receives data;
a memory configured to store information comprising a program instruction;
a processor in communication with the transmitter, receiver and memory such that, when the processor executes the program instruction, the processor is configured to cooperate with the transmitter and receiver to acquire, from a core network entity, a first maximum downlink delay tolerance (MDDT) of user equipment associated with the apparatus,
wherein the MDDT indicates a maximum delay tolerance value associated with consecutive receipt of downlink data of all services on the user equipment;
determine time information of a MDDT timer by using the MDDT,
wherein the time information of the MDDT timer comprises a start time and an end time of a user equipment status associated with the MDDT;
change the active state to a sleep mode (SLM) state in response to completing a processing of downlink data and start the MDDT timer,
wherein the SLM state is a state in which the user equipment stops listening on a network and forbids receiving further downlink data; and
start an idle state timer (IST) at the end time of the MDDT timer, and change the state of the user equipment from the SLM state to an idle state.

2. The data processing apparatus according to claim 1, wherein:
the receiver is further configured to cooperate with the processor to acquire an idle state (IS) value from the core network entity, and provide the IS value to the processor, wherein the IS value is a duration when the apparatus is in the idle state; and
the processor is further configured to:
determine time information of the IST by using the first IS value,
wherein the time information of the IST comprises a start time and an end time of a UE status associated with the IS value; and
change the UE status associated with the IS value according to the time information of the IST.

3. The data processing apparatus according to claim 1, wherein the idle state is a state in which the apparatus listens on the network in a discontinuous reception (DRX) manner.

4. A data processing apparatus comprising:
a memory configured to store information comprising a program routine;
a processor, coupled with the memory, for executing the program routine, thereby causing the processor to be configured to:
determine a maximum downlink delay tolerance (MDDT),
wherein the MDDT indicates a maximum delay tolerance value associated with the apparatus processing downlink data of all services on a user equipment (UE), and
wherein the UE is any user equipment managed by the apparatus;
determine time information of a MDDT timer by using the second MDDT, and
wherein the time information of the MDDT timer comprises a start time and an end time of a core network entity status associated with the MDDT; and
change the core network entity status according to the time information of the MDDT timer, including
changing the core network entity status from an active state to a sleep mode (SLM) state in response to completing the processing of downlink data and starting the MDDT timer,
wherein the SLM state is a state in which the UE stops listening on a network and forbids receiving further downlink data; and
starting an idle state timer (IST) at the end time of the MDDT timer and changing the core network entity status from the SLM state to an idle state.

5. The data processing apparatus according to claim 4, wherein the processor is further configured to:
determine a idle state (IS) value that is duration when the core network entity status is in the idle state when the apparatus is processing all the services on the UE;
determine time information of the IST by using the IS value, wherein the time information of the IST comprises a start time and an end time of the core network entity status associated with the IS value; and change the core network entity status according to the time information of the IST timer.

6. The data processing apparatus according to claim 4, wherein the processor is further configured to:

start the IST at an end time of the MDDT timer, and change the SLM state to the idle state at a start time of the IST, wherein the idle state is a state in which the apparatus sends paging information to the UE in a discontinuous reception (DRX) manner.

7. The data processing apparatus according to claim 4, further comprising: a receiver and transmitter, the receiver configured to:

implement one of the following:
(a) cooperating with the processor to receive an MDDT associated with the UE that is sent by the UE; and
(b) receiving an MDDT associated with each service on the UE that is sent by the UE; implement one of the following:
(a) providing the MDDT associated with each service on the UE to the processor and receive an idle state (IS) value associated with the UE that is sent by the UE; and
(b) acquiring, from a home subscriber server (HSS), an MDDT associated with the UE or an IS value associated with the UE; and
wherein the processor is further configured to determine, by using the MDDT associated with each service on the UE or the MDDT associated with the UE, and set the IS value associated with the UE.

8. The data processing apparatus according to claim 7, wherein the MDDT is a second MDDT, the IS value is a second IS value and the processor is further configured to:

determine a first MDDT and the second MDDT by using the MDDT associated with the UE, wherein the first MDDT indicates a maximum delay tolerance value which is associated with the UE processing the downlink data of all the services on the UE;

determine a first IS value and the second IS value by using the IS associated with the UE, wherein the first IS value is duration when the UE is in the idle state; and provide the first MDDT and the first IS value to one or both of the receiver and transmitter; and the transmitter is configured to send the first MDDT and the first IS value to the UE.

9. The data processing apparatus according to claim 4, wherein when the apparatus is in the idle state and the receiver receives signaling that triggers receiving of mobile originated (MO) sent by the UE, the processor is further configured to:

stop the IST;
change the idle state to the active state; and
provide, to one or both of the receiver and transmitter, a message carrying information that the idle state is changed to the active state; and
the receiver is configured to cooperate with the processor to receive the MO when the idle state is changed to the active state.

10. A data processing method comprising:

determining, by a core network entity, a maximum downlink delay tolerance (MDDT) that indicates a maximum delay tolerance value associated with the core network entity processing downlink data of all services on a user equipment (UE), and the UE is any user equipment managed by the core network entity;

determining, by the core network entity, time information of a MDDT timer by using the MDDT, wherein the time information of the MDDT timer comprises a start time and an end time of a core network entity status associated with the MDDT, wherein the core network entity status comprises an active state and a sleep mode (SLM) state;

change the active state to a sleep mode (SLM) state in response to completing a processing of downlink data and start the MDDT timer, wherein the SLM state is a state in which the user equipment stops listening on a network and forbids receiving further downlink data; and start an idle state timer (IST) at the end time of the MDDT timer, and change the state of the user equipment from the SLM state to an idle state.

11. The data processing method according to claim 10, further comprising:

determining, by the core network entity, an idle state (IS) value, wherein the IS value is a duration when the core network entity is in the idle state and processing all the services on the UE;

determining, by the core network entity, time information of the IST by using the IS value, wherein the time information of the IST comprises a start time and an end time of the core network entity status associated with the IS value; and changing, by the core network entity, the core network entity status according to the time information of the IST timer.

12. The data processing method according to claim 10, wherein the core network entity status further comprises the idle state and wherein changing, by the core network entity, the core network entity status according to the time information of the IST timer comprises:

starting, by the core network entity, the IST at an end time of the MDDT timer; and changing the SLM state to the idle state at a start time of the IST, wherein the idle state is a state in which the core network entity sends paging information to the UE in a discontinuous reception (DRX) manner.

13. The data processing method according to claim 10, further comprising:

implementing one of the following:
(a) receiving, by the core network entity, the MDDT associated with the UE that is sent by the UE; and
(b) receiving the MDDT associated with each service on the UE that is sent by the UE; and
implementing one of the following:
(a) determining the MDDT associated with the UE by using the MDDT associated with each service on the UE; and
(b) acquiring, from a home subscriber server (HSS), the MDDT associated with the UE.

14. The data processing method according to claim 13, wherein the MDDT is a second MDDT, an idle state (IS) value is a second IS value and the method further comprises:

determining, by the core network entity, a first MDDT and the second MDDT by using the MDDT associated with the UE, wherein the first MDDT indicates a maximum delay tolerance value associated with the UE processing the downlink data of all the services on the UE;

determining, by the core network entity, a first IS value and the second IS value by using the IS value associated with the UE, wherein the first IS value is a duration when the UE is in an idle state; and sending, by the core network entity, the first MDDT and the first IS value to the UE.

15. The data processing method according to claim 10, further comprising:

when the core network entity is in the idle state and receives mobile originated (MO) sent by the UE, stopping, by the core network entity, the IST, changing the idle state to the active state, and receiving the MO; and when the core network entity is in the SLM state and receives the MO sent by the UE, stopping, by the core network entity, the MDDT timer, changing the SLM state to the active state, and receiving the MO.

16. The data processing method according to claim 10, further comprising one of the following:

(a) receiving, by the core network entity, the IS value associated with the UE that is sent by the UE;

(b) setting the IS value associated with the UE; and (c) acquiring, from a home subscriber server (HSS), the IS value associated with the UE.

* * * * *